(12) United States Patent
Martin et al.

(10) Patent No.: US 10,561,950 B2
(45) Date of Patent: Feb. 18, 2020

(54) MUTUALLY ATTACHABLE PHYSICAL PIECES OF MULTIPLE STATES TRANSFORMING DIGITAL CHARACTERS AND VEHICLES

(71) Applicant: Hasbro, Inc., Pawtucket, RI (US)

(72) Inventors: Frederic Martin, Quebec (CA); Marie Hélène Boivin, Quebec (CA); Daniel Judkins, Providence, RI (US)

(73) Assignees: HASBRO, INC., Pawtucket, RI (US); MARTIN-BOIVIN INNOVATIONS INC., Quebec (CA)

( * ) Notice: Subject to any disclaimer, the term of this patent is extended or adjusted under 35 U.S.C. 154(b) by 376 days.

(21) Appl. No.: 14/812,703

(22) Filed: Jul. 29, 2015

(65) Prior Publication Data

US 2016/0144283 A1 May 26, 2016

Related U.S. Application Data

(60) Provisional application No. 62/031,014, filed on Jul. 30, 2014.

(51) Int. Cl.

| | |
|---|---|
| *A63F 9/24* | (2006.01) |
| *A63F 13/00* | (2014.01) |
| *G06F 17/00* | (2019.01) |
| *G06F 19/00* | (2018.01) |
| *A63F 13/825* | (2014.01) |
| *A63F 13/73* | (2014.01) |
| *A63F 13/69* | (2014.01) |
| *A63F 9/16* | (2006.01) |
| *A63H 1/00* | (2019.01) |

(Continued)

(52) U.S. Cl.
CPC .............. *A63F 13/825* (2014.09); *A63F 9/16* (2013.01); *A63F 9/24* (2013.01); *A63F 13/213* (2014.09); *A63F 13/215* (2014.09); *A63F 13/216* (2014.09); *A63F 13/69* (2014.09); *A63F 13/73* (2014.09); *A63F 13/85* (2014.09); *A63F 13/95* (2014.09); *A63H 1/00* (2013.01); *G07F 17/323* (2013.01); *G07F 17/3206* (2013.01); *G07F 17/3209* (2013.01); *G07F 17/3216* (2013.01); *A63F 13/46* (2014.09); *A63F 13/67* (2014.09); *A63F 2009/2435* (2013.01); *A63F 2009/2447* (2013.01); *A63H 2200/00* (2013.01)

(58) Field of Classification Search
USPC .............................. 463/1, 20, 22, 25, 29, 39
See application file for complete search history.

(56) References Cited

U.S. PATENT DOCUMENTS

| | | | |
|---|---|---|---|
| 3,875,456 A | 4/1975 | Kano et al. | |
| 4,493,219 A | 1/1985 | Sharp et al. | |

(Continued)

*Primary Examiner* — Adetokunbo O Torimiro
(74) *Attorney, Agent, or Firm* — Perry Hoffman

(57) ABSTRACT

Gaming systems and methods for integrated computer-related and physical game play interactions between a game player, a physical game piece character and an electronic device are defined. The physical game piece character may be a combination of smaller parts where each combination transmits a unique alphanumeric identifier and control signals to an electronic device game application, where the game application features the physical game piece character and is responsive to the signals from the physical game piece character and transmits control signals to the physical game piece, which responds with sensory signals.

20 Claims, 12 Drawing Sheets

(51) Int. Cl.
  *A63F 13/95*    (2014.01)
  *G07F 17/32*    (2006.01)
  *A63F 13/213*   (2014.01)
  *A63F 13/215*   (2014.01)
  *A63F 13/216*   (2014.01)
  *A63F 13/85*    (2014.01)
  *A63F 13/46*    (2014.01)
  *A63F 13/67*    (2014.01)

(56) References Cited

U.S. PATENT DOCUMENTS

| | | | |
|---|---|---|---|
| 4,989,881 A | 2/1991 | Gamble | |
| 5,102,131 A | 4/1992 | Remington | |
| 5,305,013 A | 4/1994 | Daniels | |
| 5,746,602 A | 5/1998 | Kikinis | |
| 5,752,880 A | 5/1998 | Gabai et al. | |
| 5,864,333 A | 1/1999 | O'Heir | |
| 5,947,846 A | 9/1999 | Craig | |
| 5,971,855 A | 10/1999 | Ng | |
| 5,976,038 A | 11/1999 | Orenstein et al. | |
| 6,016,038 A | 1/2000 | Mueller et al. | |
| 6,022,273 A | 2/2000 | Gabai et al. | |
| 6,024,675 A | 2/2000 | Kashiwaguchi | |
| 6,075,195 A | 6/2000 | Gabai et al. | |
| 6,149,490 A | 11/2000 | Hampton et al. | |
| 6,150,774 A | 11/2000 | Mueller et al. | |
| 6,160,986 A | 12/2000 | Gabai et al. | |
| 6,164,973 A | 12/2000 | Macri et al. | |
| 6,184,865 B1 | 2/2001 | Zimmerman et al. | |
| 6,206,745 B1 | 3/2001 | Gabai et al. | |
| 6,213,872 B1 | 4/2001 | Harada et al. | |
| 6,257,948 B1 | 7/2001 | Silva | |
| 6,290,565 B1 * | 9/2001 | Galyean, III | A63H 3/16 273/148 B |
| 6,290,566 B1 | 9/2001 | Gabai et al. | |
| 6,319,010 B1 | 11/2001 | Kikinis | |
| 6,352,478 B1 | 3/2002 | Gabai et al. | |
| 6,356,867 B1 | 3/2002 | Gabai et al. | |
| 6,368,177 B1 | 4/2002 | Gabai et al. | |
| 6,514,117 B1 | 2/2003 | Hampton et al. | |
| 6,544,098 B1 | 4/2003 | Hampton et al. | |
| 6,585,622 B1 | 7/2003 | Shum et al. | |
| 6,773,322 B2 | 8/2004 | Gabai et al. | |
| 6,773,344 B1 | 8/2004 | Gabai et al. | |
| 6,888,322 B2 | 5/2005 | Dowling et al. | |
| 6,959,166 B1 | 10/2005 | Gabai et al. | |
| 6,997,772 B2 | 2/2006 | Fong | |
| 7,314,407 B1 | 1/2008 | Pearson | |
| 7,454,002 B1 | 11/2008 | Gardner et al. | |
| 7,862,428 B2 | 1/2011 | Barge | |
| 7,902,840 B2 | 3/2011 | Zachut et al. | |
| 7,927,253 B2 | 4/2011 | Vincent et al. | |
| 7,946,493 B2 | 5/2011 | Havens et al. | |
| 7,993,201 B2 | 8/2011 | Matsumoto et al. | |
| 8,199,114 B1 | 6/2012 | Jaeger | |
| 8,261,992 B2 | 9/2012 | Havens et al. | |
| 8,272,945 B2 | 9/2012 | Kelly et al. | |
| 8,323,068 B2 | 12/2012 | Ganetakos et al. | |
| 8,337,271 B2 | 12/2012 | Campbell et al. | |
| 8,353,770 B2 | 1/2013 | Lu | |
| 8,358,286 B2 | 1/2013 | Cannon | |
| 8,368,662 B2 | 2/2013 | Argiro | |
| 8,401,343 B2 | 3/2013 | Braun | |
| 8,838,471 B1 | 9/2014 | Shum et al. | |
| 8,894,462 B2 * | 11/2014 | Leyland | A63F 13/02 446/175 |
| 2002/0193045 A1 | 12/2002 | Lee et al. | |
| 2004/0248650 A1 | 12/2004 | Colbert et al. | |
| 2005/0227811 A1 | 10/2005 | Shum et al. | |
| 2006/0030410 A1 * | 2/2006 | Stenton | A63F 13/02 463/43 |
| 2006/0255149 A1 | 11/2006 | Retter et al. | |
| 2006/0256090 A1 | 11/2006 | Huppi | |
| 2007/0062852 A1 | 3/2007 | Zachut et al. | |
| 2009/0027359 A1 | 1/2009 | Wong et al. | |
| 2009/0048020 A1 | 2/2009 | Gruen et al. | |
| 2009/0115133 A1 | 5/2009 | Kelly et al. | |
| 2009/0118001 A1 | 5/2009 | Kelly et al. | |
| 2009/0124379 A1 | 5/2009 | Wells | |
| 2009/0131134 A1 | 5/2009 | Baerlocher et al. | |
| 2011/0086692 A1 | 4/2011 | Guziel | |
| 2011/0165933 A1 | 7/2011 | Guziel et al. | |
| 2011/0227871 A1 | 9/2011 | Cannon | |
| 2012/0050198 A1 | 3/2012 | Cannon | |
| 2012/0190455 A1 | 7/2012 | Briggs | |
| 2012/0194457 A1 | 8/2012 | Cannon | |
| 2012/0244939 A1 | 9/2012 | Braun | |
| 2013/0012313 A1 | 1/2013 | Chen | |
| 2013/0017891 A1 | 1/2013 | Romero et al. | |
| 2013/0079139 A1 | 3/2013 | Gray | |
| 2013/0127911 A1 | 5/2013 | Brown | |
| 2013/0130779 A1 | 5/2013 | Gagner et al. | |
| 2013/0181927 A1 | 7/2013 | Madonna et al. | |
| 2013/0217482 A1 * | 8/2013 | Kelly | A63F 3/081 463/26 |
| 2016/0166924 A1 * | 6/2016 | Leyland | A63F 13/02 463/31 |

\* cited by examiner

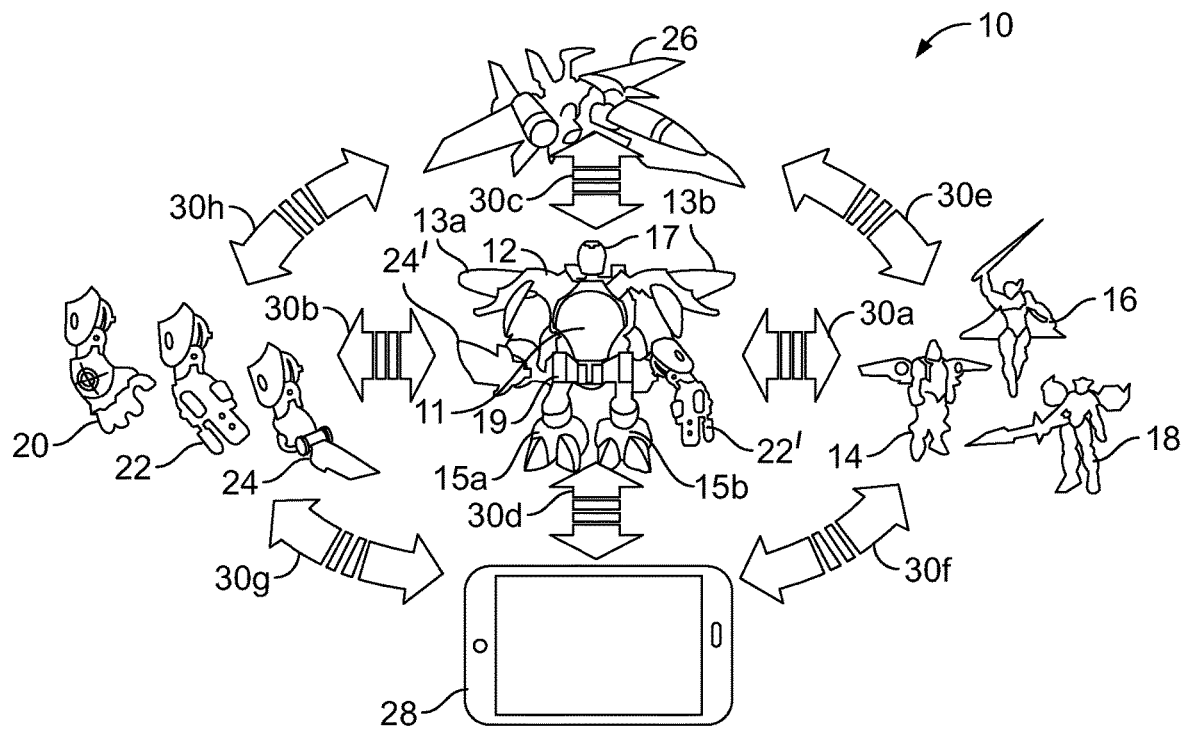
FIG. 1A
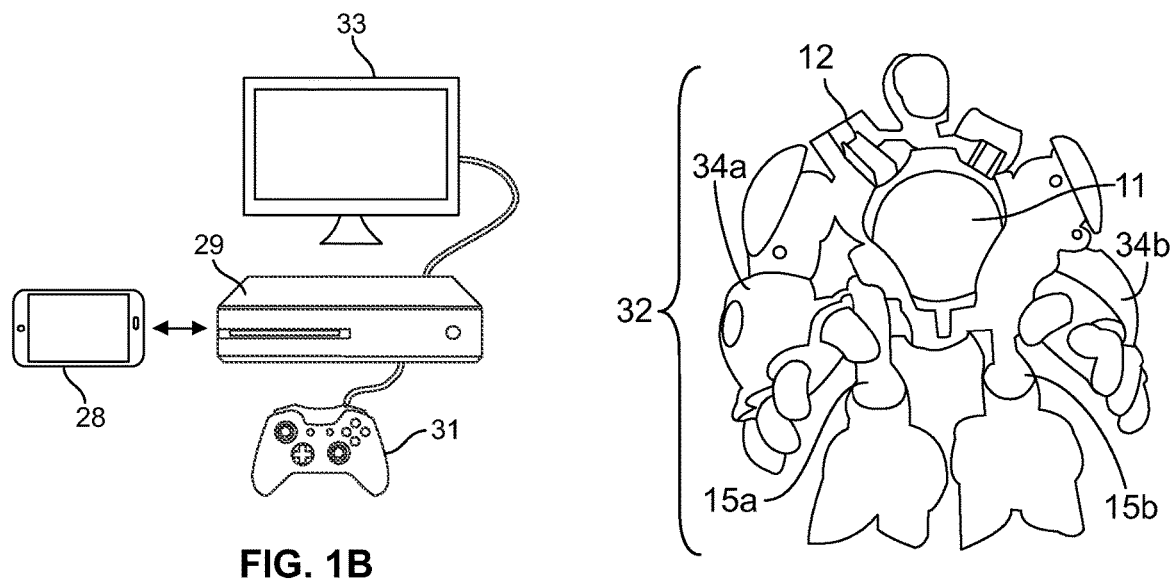
FIG. 1B
FIG. 2

MUTUALLY ATTACHABLE PHYSICAL PIECES OF MULTIPLE STATES TRANSFORMING DIGITAL CHARACTERS AND VEHICLES

CROSS-REFERENCE TO RELATED APPLICATIONS

This is a non-provisional patent application which claims priority pursuant to 35 U.S.C. 119(e) to U.S. Provisional Patent Application No. 62/031,014, filed on Jul. 30, 2014, which is expressly incorporated herein by reference.

FIELD OF THE INVENTION

The present invention relates generally to interactive games, and more particularly to game scenarios such as action figure play in the real environment, action figure play in virtual environment videogames used with mobile electronic devices, and the interaction between and among the player and the action figures in both the real and the virtual environments.

BACKGROUND OF THE INVENTION

During the past three decades, videogames have evolved tremendously and have become widely played by people of all ages and abilities. Additionally, recent years have been marked by an explosion in the use of mobile electronic devices, such as smart phones, tablet computers, portable gaming devices and the like. Correspondingly, the popularity of playing videogames on mobile electronic devices has also exploded.

Also in recent years, several prior art videogames, known as endless running games, have become extremely popular. In endless running games, a player begins the game with a certain amount of resources for playing the game, and the game runs until the player exhausts all his or her resources; during the game, the player may increase resource levels through various game play events. Traditionally, these increased resources are earned from within the videogame, for example, by accumulating a certain number of points resulting from videogame play. Thus, the increased resources have been accumulated fully within a virtual environment.

Likewise, several prior art videogames involving battles between characters have also become extremely popular. Many of these videogame battles run on the type of resources discussed above, with these resources accumulated fully within the virtual environment. Also, racing games, which may involve driving or flying, have been many players' favorite type of game. Similarly, role playing videogames, which have run the gamut from socializing challenges to space mining and have included many scenarios in between, entertain throngs of game players. In sum, videogames of all types have popularly covered countless subjects to the point where almost everyone may have a videogame that appeals to them.

Corresponding to the evolution of videogame variety, modern physical toys with interchangeable parts and physical toys with transformable shapes have filled store shelves. Beyblades™ from Hasbro™ offer one who plays with the physical top the ability to customize the top with interchangeable parts by changing the color of the top as well as the shape of and design on the crown of the top. Also, Transformers™ from Hasbro™ offer players the pleasure of changing a single toy from a robot to a vehicle and back. Additionally, Construct-Bots™ from Hasbro™ let a player change parts and transform the toy into different forms to provide both interchangeable parts and transformation characteristics.

In the prior art, toys with interchangeable parts have taken various forms. U.S. Pat. No. 6,257,948 to Silva for "Talking Toy with Attachable Encoded Appendages" discloses a toy figure with interchangeable body parts that plays voice messages with recognized combinations of body parts. U.S. Pat. No. 8,337,271 to Campbell et al. for "Reconfigurable Toy" discloses a toy that can be reconfigured between a power-suit and a vehicle that can hold a small action figure as an operator. U.S. Patent application US 2002/0193045 by Lee, et al. for "Toy Robot Apparatus and Method" discloses a motorized walking robot with interchangeable arms capable of complex motions.

Over the past few decades, systems, devices and methods also have used physical activity measurements as input to computer-related systems, mainly to promote physical activity or particular products. U.S. Pat. No. 8,353,770 to Lu for "Mobile Social Fitness Networked Game" discloses a mobile device where performance data is used for fitness, socialization and potential game playing. Patent application US 2005/0227811 to Shum for "Game Pod" discloses a game pod attachable to footwear that measures physical activity and uses the measurements as input to a videogame. U.S. Pat. No. 6,585,622 to Shum for "Interactive Use an Athletic Performance Monitoring and Reward Method, System and Computer Program Product" discloses a method for rewarding athletic performance involving the use of a product worn by a person. U.S. Pat. No. 6,213,872 to Harada, et al. for "Pedometer with Game Mode" discloses a pedometer with a game mode for a child.

Various sports balls, pucks and the like are known which may contain an electromagnetic transmitter. For example, U.S. Pat. No. 5,976,038 to Orenstein et al. for "Apparatus for detecting moving ball" issued Nov. 2, 1999 discloses an apparatus having a game ball containing a transmitter where antennas are provided for determining whether or not the game ball has passed over a line. Orenstein et al. allows for limited user interaction with illuminating sensors that increase the interactive capabilities of the game. Similarly, the U.S. Pat. No. 5,947,846 to Craig for "Hockey Goal-'The Judge'" issued Sep. 7, 1999 describes a hockey apparatus where sensors detect whether a puck has passed over a housing line. Like Orenstein et al., the Craig patent allows for some user interaction by way of reaction to a puck crossing the line as real-world physical play activities. U.S. Pat. No. 5,864,333 to O'Heir for "Foot Force Actuated Computer Input Apparatus and Method" discloses using shoes, pads, or other similar device to generate control signals corresponding to movement. U.S. Pat. No. 6,024,675 to Kashiwaguchi for "Data-Using Game System" discloses using operational training data produced from a device such as an exercise machine as input for a videogame that is part of the exercise machine.

U.S. Patent Application No. 2013/0017891 A1 to Romero, et al. for "Systems And Methods For Providing Virtual Incentives For Real-World Activities" published Jan. 17, 2013 discloses toys and physical play objects such as sports balls or flying disks that include a sensor to generate signals conveying information regarding the amount of real-world physical play activities performed with the associated object. Romero discloses that once the amount of play crosses a threshold level, its user may be presented with a code, from which the user may redeem virtual benefits and incentives for use in virtual-world videogame environments such that real-world physical activity is encouraged through virtual space benefits.

Because the play of videogames has largely been fueled with battle victories, energy, or points, earned or otherwise accumulated from within the virtual environment of the played game, the enjoyment of the game has been limited. Likewise, because these games in the physical, real environment have remained fully within the physical, real environment, the enjoyment of those games has also been limited. It would be advantageous to enhance the enjoyment of videogames and real world physical games by providing games that involve many characters created from interchangeable parts and alternating between the real world environment and the virtual environment during a single game as well as through multiple games while providing feedback to the player from each environment. Accordingly, it would be desirable to provide a game that involves many characters created from interchangeable parts that alternate between play in the real world environment and play in a virtual environment. This can be accomplished by producing a physical game piece composed of one or more interchangeable parts and capable of communicating with and being identified by an application on an electronic device, where the application on the electronic device recognizes the composition of interchangeable parts and provides a virtual character matching the combination of interchangeable parts for a multi-way interaction between the player, the physical toy and the videogame in the virtual environment. The inventions discussed in connection with the described embodiments address these and other deficiencies of the prior art.

The features and advantages of the present inventions will be explained in or apparent from the following description of the preferred embodiment considered together with the accompanying drawings.

SUMMARY OF THE INVENTION

The present inventions address deficiencies in the prior art of integrated computer-related and physical game play interactions by defining a gaming system involving interactions between a player, a physical game piece and an electronic device, where the behavior of the physical game piece changes in response to signals from the player, such as voice commands or physical manipulation, and from the game on the electronic device, such as electronic voice commands or inaudible electronic signals, and where the behavior of the game on the electronic device changes in response to signals from the player, such as voice commands or other user input, and from the physical game piece, such as electronic voice commands or inaudible electronic signals. Further, the physical game piece may consist of two or more uniquely identifiable, mutually attachable smaller game pieces, thus creating a unique combination as a single game piece.

Specifically, the described embodiment uses Micronauts™ characters and Micronauts™ related vehicles, weapons, robots and other related physical game pieces, either singly or combined, as the physical game piece interacting with an electronic device. The electronic device executes a game application associated with the physical game piece. In the described embodiment, the game application has a digital character uniquely associated with the specific Micronauts™ character, and, likewise, a digital character with a unique combination of characteristics related to the specific combination of Micronauts™ characters and Micronauts™ related vehicles, weapons, robots and other related physical game pieces. Additionally, exclusive game content becomes accessible in the game application for each combination.

Each physical game piece, whether a single piece or a combination of two or more mutually attachable pieces, is identifiable by a unique alphanumeric identifier. The described physical game piece has multiple states where each state may be identified by a sensory detectable signal, such as an emitted light pattern or sound pattern, for example. The physical game piece uses a signal receiver to receive control signals that change the state of the game piece by changing the sensory detectable signals.

The physical game piece is further configured to transmit the unique alphanumeric identifier along with an electronic-device-readable signal that indicates in which of the multiple states the physical game piece currently exists. Thus, while a player is playing with the described physical game piece, that game piece uses a multi-state signal generator to respond to received control signals by broadcasting the unique alphanumeric identifier along with the corresponding electronic-device-readable signal that relates to the current state of the multi-state signal generator using a signal transmitter. Additionally, the physical game pieces, whether a single piece or a combination of two or more mutually attachable pieces, are configured to output one or both of the sensory detectable signals and the electronic-device-readable signals in response to mechanical manipulation of the combination of one or more game pieces.

The electronic device uses a signal receiver to receive the electronic-device-readable signals from the physical game piece, a signal transmitter to transmit control signals to the physical game piece to control the sensory detectable outputs from the physical game piece, and a user input interface configured to receive user input.

The game application features a digital character uniquely associated with the unique alphanumeric identifier that identifies a single game piece or a combination of game pieces. During the game, the player increases an accumulated game score by sequentially accessing gaming modules of increasing difficulty featuring the digital character in a digital game environment. Furthermore, the digital character evolves as the difficulty level increases. In the described embodiments, the player may control the digital character using known user input interfaces, such as a keyboard, a joystick, a touchpad, a trackball, etc.

In some embodiments, the digital character evolves as the difficulty level increases. Further, the gaming modules are arranged as a database of mutually linkable storyline elements wherein each unique alphanumeric identifier corresponds to a combination of one or more storyline elements and wherein the game application progresses through the combination of one or more storyline elements corresponding to the unique alphanumeric identifier. The game application may be further configured to respond to a change in the unique alphanumeric identifier caused by a change in the configuration of the plurality of mutually attachable physical game pieces with a corresponding change in the combination of one or more storyline elements. Consequently, the number of unique alphanumeric identifiers to which the game application responds may be limited based on the current storyline element.

The game application communicates with the signal receiver, the transmitter and the user input interface in the electronic device. The game application responds to signals received from the physical game piece and to user input from the user input interface using a game piece electronic-device-readable signal interpreter. The game application has a table of the known unique alphanumeric identifiers. The game piece electronic-device-readable signal interpreter receives the unique alphanumeric identifier and game piece electronic-device-readable signal originating from the physical game piece, queries the table to match the unique alphanumeric identifier to a table element, interprets the game piece electronic-device-readable signal, and transmits signals to control the sensory detectable outputs for the physical game piece to receive in response to the game piece electronic-device-readable signal when the unique alphanumeric identifier matches a table element. The player accesses the sequentially accessible gaming program modules and increases the difficulty level and the accumulated game score based on the quantity of output from the game piece electronic-device-readable signal interpreter and the quantity and pattern of user input.

In some embodiments, the game application may further use multipliers as a feature to reward a player for both physical game play and computer-related game play. With multipliers, the value of either the difficulty level or the accumulated game score, or both, gets increased by a predetermined multiple based on the quantity of output from the game piece electronic-device-readable signal interpreter and the quantity and pattern of user input. During game play, the game application may be configured to connect to a network and access a network site to let users make in-application purchases using the accumulated game score or real currency.

In some embodiments, the electronic device may further have a camera and a display, where the camera is configured to capture an image of the area viewable by the electronic device and where the game application is configured to communicate with the camera and the display to combine the image of the area viewable by the electronic device with the digital game environment into an integrated game field on the display and to involve the user, the physical game piece, and the digital character in a game using the integrated game field. This configuration may be enhanced with a geographic location sensor configured to create a digital map of the area surrounding the electronic device such that the game application communicates with the geographic location sensor to expand the integrated game field beyond the area viewable by the electronic device to include the area defined by the digital map.

BRIEF DESCRIPTION OF THE DRAWINGS

The inventions will now be more particularly described by way of example with reference to the accompanying drawings, the advantages of which may be best understood with reference to the following detailed description taken in conjunction with the drawing figures, in which:

FIG. 1A shows a gaming ecosystem of the described embodiments.

FIG. 1B shows that a game console and associated peripherals may be used instead of or in conjunction with an electronic device.

FIG. 2 shows a physical game piece embodied as a robot with moveable and interchangeable parts.

Figure 3A:
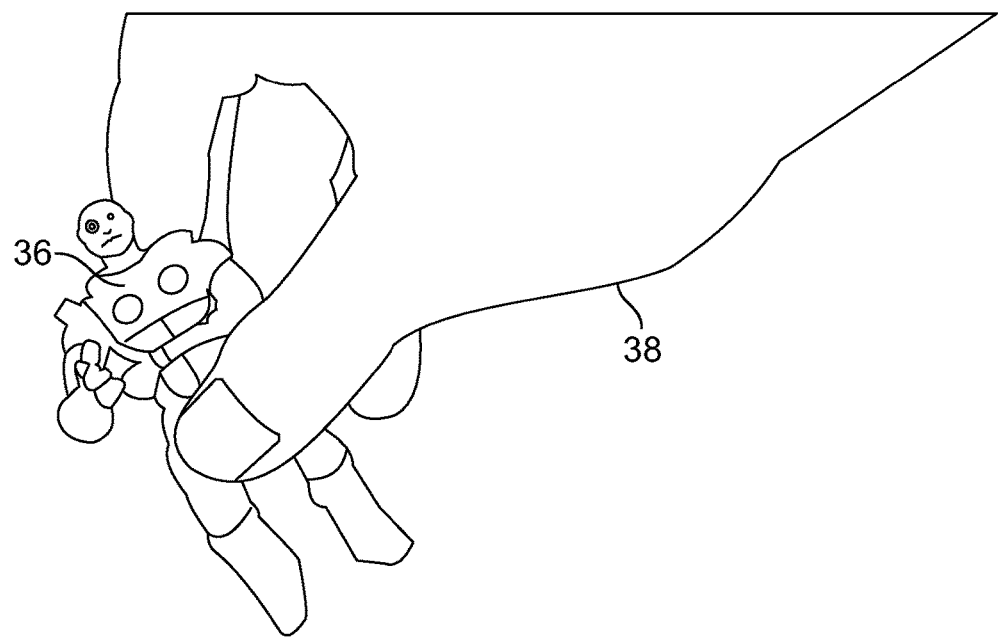
FIG. 3A shows a small action figure compared to the size of a player's hand.

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

DETAILED DESCRIPTION OF THE EMBODIMENTS

A described embodiment is a game ecosystem with several components. The game ecosystem and its advantages may be understood by the following detailed description of various elements of the system taken in conjunction with the accompanying figures.

Embodiments include gaming systems and methods for integrated computer-related and physical game play interactions having a physical game piece and an electronic device. The physical game piece may be a toy robot, such as the aforementioned Micronauts™. The electronic device may be a tablet computer, a smart phone, a laptop computer, a gaming console or the like. Further, a gaming console may be used in conjunction with other electronic devices.

The play pattern of the described embodiments focuses on strong customization and interchangeability where players may combine different parts, which may be sold separately in different bundles, to create several character and vehicle combinations, where each specific combination has a unique personality and a unique set of special skills and useable accessories that unlock exclusive game content. Additionally, each specific combination may be uniquely identifiable to a videogame application running on the electronic device. The play pattern between the physical and the digital, or virtual, components are highly interchangeable and all-way communication exists between and among the player, the physical toy, and the electronic device. Play with the physical toy will influence and change the virtual play, and play with the virtual elements will influence and change the way that the physical toy works. An action in the virtual environment, such as a virtual character raising its arm, may cause a corresponding arm raising in the physical toy, where the physical character is composed of several parts and the virtual character is composed of virtual versions of those same parts. An action in the real environment, such as a physical toy character raising its arm, may cause a corresponding arm raising in the virtual character, where the virtual character is composed of several parts and the physical character is composed of physical versions of those same parts.

The virtual character will exist in the virtual environment within a videogame application running on an electronic device, where the videogame application provides the digital portal for frictionless travel between the physical environment and the virtual environment or within an environment that is a combination or an overlapping of both the physical environment and the virtual environment. To further provide for frictionless travel within the various environments, the physical game piece character and the virtual character may be the same scale, or size, in the physical environment as in the virtual environment.

The videogame application of a described embodiment provides an epic adventure where the player teams up with a Micronauts™ character and uses teamwork to explore, discover and solve challenges created from overlapping real and virtual universes, or environments. The videogame adventure will reveal a narrative story behind the characters' universe, the characters themselves, and the conflicts that they face in both the real and the virtual worlds. Each physical toy, or unique combination of parts to create one physical toy, will be uniquely identifiable in the real and virtual worlds and will follow a unique story within the virtual environment, so the player will always have an opportunity to explore previously undiscovered portions of a whole story tapestry as new pieces and toys are created and new combinations of parts assembled. Because the player must assemble the physical toy to control the videogame character so that the player, the physical toy and the virtual character work together, the player, the physical toy and the videogame character form a team. In the described embodiments, the physical toy and the videogame application communicate via a protocol such as read/write NFC, RFID, or something similar.

The story tapestry may be a collection of interrelated story modules that may be thought of as a tapestry and linked in various ways so that different action figures, which are different combinations of attachable parts, unlock different story missions and corresponding narratives. Different missions reveal different parts of the overall story tapestry.

The toy line in a described embodiment involving Micronauts™ characters focuses around the character of BioTron™, a twelve-inch tall complex and sentient robot/android character. For reasons beyond his control BioTron™ was thrust through a portal into our universe and has landed on Earth. Unfortunately, traveling into our universe scrambled most of BioTron's™ sophisticated systems. His memory cores and abilities have been jumbled, leaving him with only his basic operating systems intact and functional. In the game storyline, the player discovers BioTron™ in a physical state and mistakes BioTron™ for a cool toy robot. The player realizes that the player's mobile device is the way to communicate and interact with BioTron™, so the player must establish a link between the physical toy and the virtual character. Meanwhile, in the videogame application, BioTron™ introduces himself and begins to tell his story, which is limited due to his scrambled memory cores. BioTron™ asks for the player's help in restoring his functionality and returning him to the Micronauts™ Universe. The videogame application in a described embodiment will generally involve one player, although multi-player games are possible.

A game in the described embodiment has several features. The game has interchangeable parts in the real world that, when changed, evoke corresponding changes in the virtual world. That is, if a player swaps BioTron's™ arm for a blaster, the digital, or virtual, version of BioTron's™ arm will also change into a blaster.

The game uses interchangeable pilots. For example, a Micronaut™ pilot action figure is a small action figure that pilots BioTron™. By placing the pilot action figure into BioTron™, a larger figure, BioTron™ will respond using lights and sound, although other sensory signals, such as motion, may be used. In the virtual environment, the pilot action figure comes to life on the screen of the electronic device, engaging the player with a story narrative and game play directions in the form of advice or hints. If the player swaps the pilot for a different pilot, the indicators, such as light and sound and movement will signal the swap, and the character in the virtual environment will change accordingly, with the storyline also changing accordingly.

The game provides virtual environment and real environment interactivity where player actions in the virtual world will result in physical actions in the real world and where physical actions in the real world will result in actions in the virtual world. For example, if a player activates BioTron's™ wing pack in the virtual game, the wing pack on the physical toy will move into its activation position; if a player fires BioTron's™ blaster in the virtual game, the blaster on the physical toy will activate with motion, sound and lights; if BioTron gets hit in the virtual game, the physical toy BioTron™ reacts with lights, sound and movement as if it has been hit. Also in a described embodiment, player actions while using the physical toy will be rewarded when playing the virtual experience. For example, by repeatedly firing BioTron's™ blaster in the physical world, a player will unlock power-ups for the same weapon in the virtual world. As with the pilot swap, when the player switches physical accessories, such as weapons, wings, appendages, etc., the indicators, such as light and sound will signal the swap, and the character in the virtual environment will change accordingly, with the storyline also changing accordingly. For the pilot swap, the accessory swap or any other swap, the exchange may occur during the game play, and the story will change accordingly. Also, if a pilot or accessory is removed or added during game play, the story will adjust and continue without the accessory or with the added accessory respectively.

In the described embodiments, the characters and vehicles, such as the Micronauts™ and BioTron™, will be able to level up in the virtual world, increasing their statistical values along a predefined path. In some of the embodiments, the physical representations of these items will retain these values through low cost self-contained memory and/or cloud/server storage so that the physical toy may respond according to the level at the time when the player last left digital, or virtual, game. Additionally, accessories, such as blasters, swords and jetpacks, for example, can level up in the virtual world, increasing their statistical values along a predefined path. Again, the physical representations of these items will retain these values through low cost self-contained memory and/or cloud/server storage.

In the embodiments, the player may experience further features. For example, the player will be able to voice commands, such as "fire lasers", "launch missiles", "shields", etc. that will trigger lights and sounds from the toy, and a narrative response from the virtual character in the videogame application. The player may use geocashing, where, using digital location finding in the real world, users will be able to track and find fictional locations in the virtual world or the combined world.

FIG. 1A shows a gaming ecosystem of the described embodiments. The gaming ecosystem 10 centers around the main physical game part 12, that, in the described embodiment, has a head 17, a torso, of which only the chest plate 11 shows in FIG. 1A, a belt 19, and two legs, 15a-b. Action figures may be used to pilot, or control, the physical character that will consist of the main physical game part 12, and any accessories or vehicles. The shown action figures are a winged male pilot 14, a caped female pilot 16, and a daggered male pilot 18. In some described embodiments, the chest plate 11 opens and a single pilot fits inside a cavity. Thus, the pilot may control the larger figure. Accessories are attachable to the main physical game part 12, such as a hand arm attachment 20, a blaster arm attachment 22, and a bladed arm attachment 24. FIG. 1A shows the main physical game part 12 combined with a blaster arm attachment 22' and a bladed arm attachment 24'. The main physical game part 12, either alone or combined with one or more action figures and accessories, may further attach to a physical toy vehicle attachment 26 for further action play. In FIG. 1A, the vehicle attachment 26 is a plane that is large enough to provide imaginable play.

Once the final physical game piece, which is a combination of the main physical game part 12, action figures, accessories, and vehicles, is assembled, it may communicate wirelessly to an electronic device element 28 of the defined game ecosystem and further to a videogame running on the electronic device element 28. The contents and the subject matter of the videogame may relate directly to the assembled character such that the assembled character and all its parts provide the subject matter for the videogame and its story. The character in the videogame may look like the assembled character.

The chest plate 11 further may have various colored lights that light the chest plate to indicate a specific quality or power of the main physical game part 12 used that will exist in the final game piece assembled from one or more pieces. For example, a character may have a purple light to signify power over time, a red light to indicate the power of fire, a red and yellow combined light to show technical qualities, a yellow light to show the power of light, or illumination, a green light to show power over organic matter, a light blue light to show power over air, and a dark blue light to show power over water.

In the described videogame, the main physical character, through the main physical game part 12, is able to share the defined power with others, including the virtual characters in the videogame. In this example, the electronic device element 28 has a camera that the videogame may use to detect the color illuminated from the chest plate 11 of the main physical game part 12 belonging to the assembled character. Once the videogame application detects the color used, the videogame will supply the power represented by the color illuminated to the virtual character in the videogame that reflects the assembled character. Additionally, these powers may be transferred to the action figures, accessories, and vehicles, which may give sensory output to indicate the transfer.

FIG. 1A further shows the communications channels 30a-h between the various components of the described embodiments. The communications channels 30a-h demonstrate an identification process that occurs when physical parts are attached to each other or an electronic communication occurs between elements of the ecosystem. For example, communication channel 30a shows that the main physical game part 12 will recognize which pilot, the winged male pilot 14, the caped female pilot 16, or the daggered male pilot 18, is attached to it. This attachment may be communicated to the various parts of the ecosystem in different ways, such as by a unique alphanumeric identifier transmitted via NFC or RFID or something similar, so that the unique combination may be recognized. Each unique combination of zero or more action figures, accessories or vehicles attached to the main physical game part 12 will transmit a unique alphanumeric identifier transmitted via NFC or RFID or something similar that the videogame may receive and recognize to mimic the combined figure as a virtual character in the videogame.

Likewise, the action figures may be constructed to recognize the main physical game part 12 to which they are attached. In this example, communication channel 30b shows that the main physical game part 12 will recognize which accessory is attached, and the accessories may, in some embodiments, recognize the main physical game part 12 to which they are attached. Communication channel 30c shows that the main physical game part 12 will recognize which vehicle is attached, and the vehicles may, in some embodiments, recognize the main physical game part 12 to which they are attached.

Communication channel 30d shows that the main physical game part 12, with the various attached action figures, accessories and/or vehicles, relay signals to the videogame and back, by some wireless means that may include light, sound, radio frequency, etc., to communicate between the physical portion of the environment and the virtual portion of the environment. For example, the combination of physical parts making the figure shown in the center of FIG. 1A may emit a unique alphanumeric identifier, light signals from the chest cavity 11, and sound from blaster arm attachment 22' to allow the videogame, the player, and the various parts of the ecosystem to communicate. As a result of this ecosystem, each unique combination of main physical game part 12, action figures, accessories, vehicles, and videogames will have a unique combination of light, sound, and wireless signals transmitted for the player and the videogame to react. Additionally, movement of the various parts, such as the attached accessories, such as wings, the legs 15a-b, etc., may be built into the function of the physical robot. Thus, according to this model, the videogame application may know of this movement and move the corresponding part in the virtual character, e.g. if the physical wings move, the virtual wings will move.

In the same fashion as described above, communications channels 30*e-h* show that all the components of the ecosystem may communicate with and to each other.

FIG. 1B shows that a game console and associated peripherals may be used instead of or in conjunction with an electronic device. In the defined gaming ecosystem, the electronic device element 28 may consist of a game console 29 with an associated game controller 31 and attachable game monitor 33. The game controller 31 and the game monitor 33 may be connected with wiring or wirelessly. In these instances, the game console 29 will replace the electronic device element 28 and communicate with the various attachments and game pieces described with reference to FIG. 1A. In other instances of the described embodiments, the game console 29 may provide an additional ecosystem element and may communicate with the electronic device element 28 so that an application in the mobile device element 28 may use the game monitor 33 as a second screen and so that the game controller 31 may be used to control video on either or both monitors. Thus, a player may play a game on the game console 29 while receiving feedback from the application on the electronic device element 28, or vice versa. Likewise, a player may play a game across both the game monitor 33 and the electronic device element 28 with the game controller 31. Other configurations of these elements are possible.

FIG. 2 shows a physical game piece embodied as a robot with moveable and interchangeable parts. The physical game piece 32 shown is a combination of parts, including a main physical game part 12, which has legs 15*a-b*, which may move, and a chest plate 11 that may be illuminated with various color lights to display and convey powers of the character using the main physical game part 12 and which may open to reveal a cavity to house an action figure as a pilot, or controller, of the physical game piece 32. The combination that makes the physical game piece 32 also includes hand arm attachments 34*a-b*, which may move. The combination that makes the physical game piece 32 transmits a unique alphanumeric identifier that identifies the combination for a videogame application on an electronic device to recognize and to mimic as a character in the videogame. Each combination will also provide different voices in both the real and the physical environments, however, the voice of the physical character may match the voice of the corresponding virtual character.

FIG. 3A shows a small action figure compared to the size of a player's hand. The figure shown is an action figure pilot 36 that measures a fraction of the length of a player's hand 38. Thus, as shown in FIG. 1, the action figure pilot 36 is intended to fit within a cavity of a larger figure, such as the main physical game part 12 from FIG. 1. The action figure pilot 36 has limited circuitry that allows it to be identified when attached to another game part, such as inside the main physical game part 12 from FIG. 1. In a described embodiment, when the action figure pilot 36 is plugged into the main physical game part 12 from FIG. 1, it will transmit a unique alphanumeric identifier. If a third piece is attached to the combination of the action figure pilot 36 and the physical game part 12 from FIG. 1, a different unique alphanumeric identifier will get transmitted. Likewise for a fourth part, a fifth part, etc. Additionally, changing the action figure pilot 36 will cause changes in sounds and voices made by the combination, as well as the color and pattern of illumination from the combination.

Figure 3B:
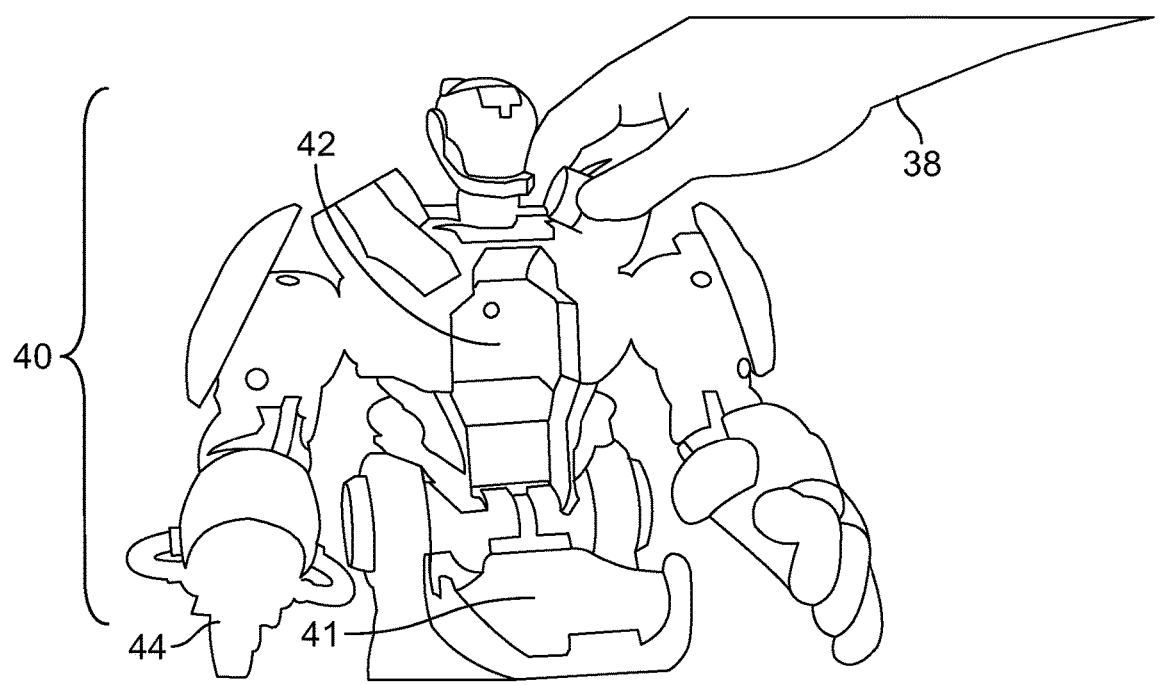
FIG. 3B shows the robot physical game piece with an exposable chest cavity.

FIG. 3B shows the robot physical game piece with an exposable chest cavity. The robot physical game piece 40 is shown with its chest plate 41 open and its chest cavity 42 exposed. The player's hand 38, when compared with FIG. 3A, shows the relative scale of the robot physical game piece 40 and the action figure pilot 36 from FIG. 3A and how the action figure pilot 36 fits inside the chest cavity 42 of the chest plate 41. FIG. 3B also shows that the right hand arm attachment 34*a* from FIG. 2 has changed to a blaster arm attachment 44. Thus, in action, this combination will transmit a unique alphanumeric identifier, make blaster noises and reflect the personality of the action figure pilot 36 and the characteristics of the robot physical game piece 40. Moreover, the appearance of this combination will transfer to the virtual character in the simultaneous videogame application as will the personality of the action figure pilot 36 and the characteristics of the robot physical game piece 40. Thus, the character is equipped to partake in game activity with the player in either the real or the virtual environment.

Figure 3C:
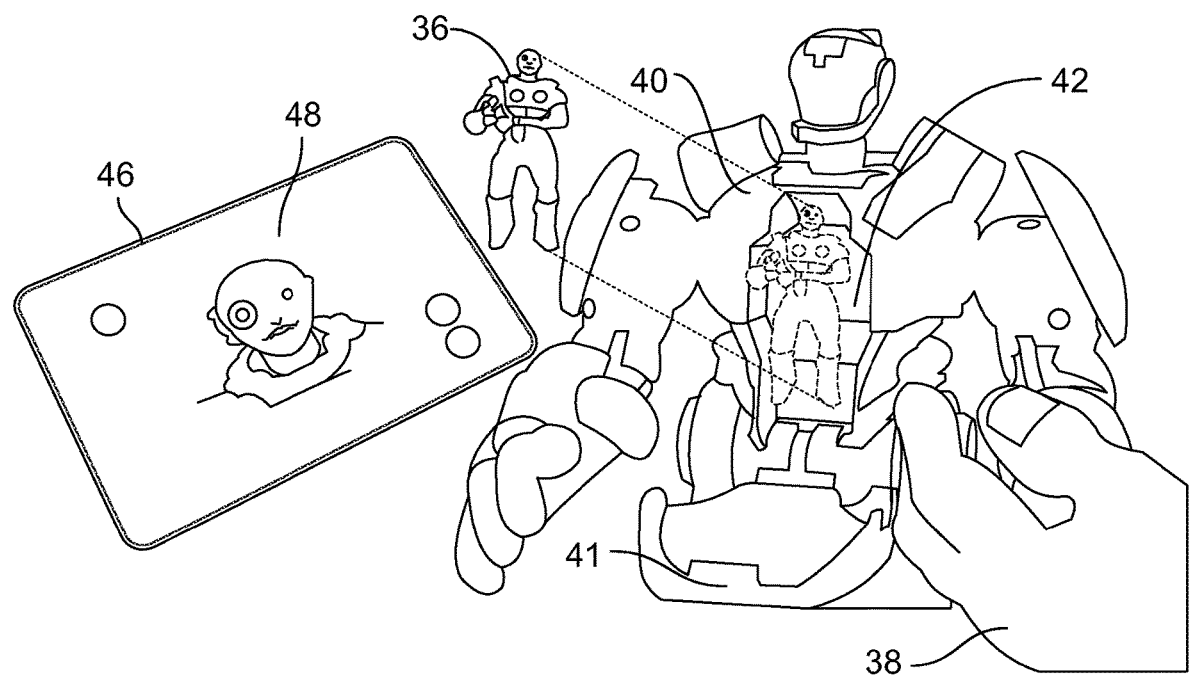
FIG. 3C shows the player snapping the action figure into the physical robot's chest cavity and the electronic device application responding.

FIG. 3C shows the player snapping an action figure into a physical robot's chest cavity and the electronic device application responding. In this figure, the robot physical game piece 40 has been moved in proximity to the electronic device 46 so that communications circuitry in the robot physical game piece 40 and the electronic device 46 are close enough to communicate and for the player to use both the robot physical game piece 40 and the electronic device 46. The player's hand 38 is shown holding the chest plate 41 and exposing the chest cavity 42 with the action figure pilot 36 inside. In some embodiments, the action in the videogame application 48 on the electronic device 46 may pause while a player changes parts, for example to switch pilots. When a part is switched, the videogame application 48 on the electronic device 46 may provide feedback, such as instruction, narrative, summaries, threats, etc.

Thus far, the described embodiments have described a gaming system for integrated computer-related and physical game play interactions using a physical game piece that transmits a unique alphanumeric identifier and that receives signals to control sensory detectable outputs, such as light, sound, movement, etc. To manage the embodiment, a multi-state signal generator is used to respond to signals received by the signal receiver by outputting the sensory detectable signals, with each sensory detectable signal corresponding to a particular state of the multi-state signal generator. The physical game piece further transmits an electronic-device-readable signal to identify its state. The described embodiments further include an electronic device that receives signal from physical game piece, that figures out the state of the physical game piece and that transmits controls signals to control the sensory detectable outputs from the physical game piece.

The embodiment also has a videogame application that accepts user input, including peripheral input from a user input device and voice and that receives signals from the physical game piece in the form of light, sound, wireless signal, etc. and the unique alphanumeric identifier. The videogame application receives a unique alphanumeric identifier and compares the identifier to a table of known unique alphanumeric identifiers. A signal interpreter compares the received unique alphanumeric identifiers to known identifiers, and, if recognized, sends a control signal to provoke a sensory response in the physical game piece. The videogame application, in response to the received signals, also provides a digital character uniquely associated with the unique alphanumeric identifier as an actor in the videogame. During the game, a player will navigate through a plurality of sequentially accessible gaming program modules of increasing difficulty, where the player may accumulate a game score. The videogame will feature the digital character version of the physical game piece, which will share appearance and capabilities. The videogame also accepts user input to control the character. The player's accumulated game score is based on the quantity of output to the physical game piece from the game piece electronic-device-readable signal interpreter and the quantity and pattern of user input. This embodiment shows, as seen in FIG. 3C, that the physical game piece can be a plurality of mutually attachable physical game pieces where each combination of one or more game pieces transmits a unique alphanumeric identifier.

Figure 4A:
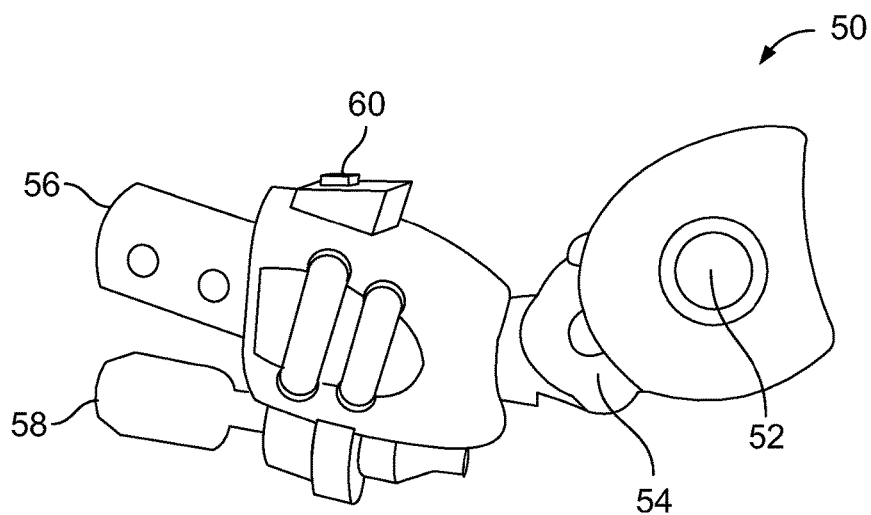
FIG. 4A shows a physical toy robotic arm.

FIG. 4A shows a physical toy robotic arm. The toy robotic arm 50 described earlier can be placed onto a robotic figure as described and either replace an existing arm be an original arm. The toy robotic arm 50 attaches to the robotic figure at the shoulder plate 52, which may move relative to the robotic figure in all possible directions. The toy robotic arm 50 further has an arm joint 54 upon which the toy robotic arm 50 may rotate. A blaster 56 will respond to signals as described and emit light and/or sound. A signal control 58 may be used to receive sound as controls and to emit sound for the player to hear and to control the videogame. A player control 60 may also be used to provide button functions such as may control sound or movement. This toy robotic arm 50, when connected to a robotic figure, will create a unique alphanumeric identifier to identify the new combination of parts. The signals transmitted from and because of the toy robotic arm 50 may all be used to control aspects of the corresponding videogame application.

Figure 4B:
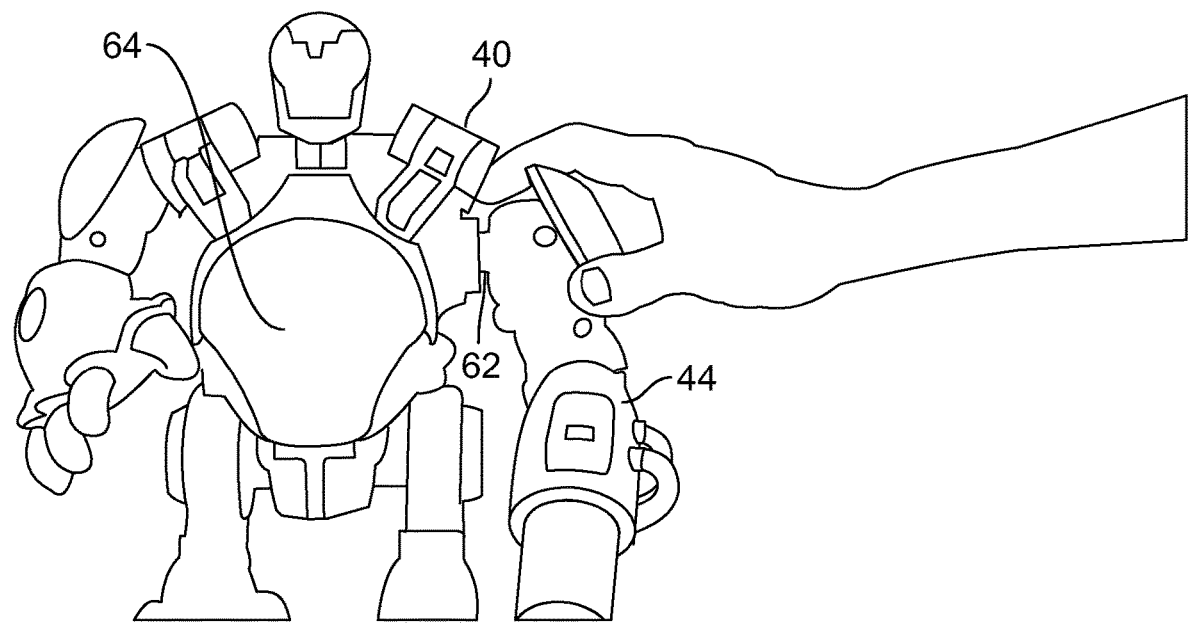
FIG. 4B shows the physical toy robotic arm attaching as an interchangeable part of the robot.
Figure 4C:
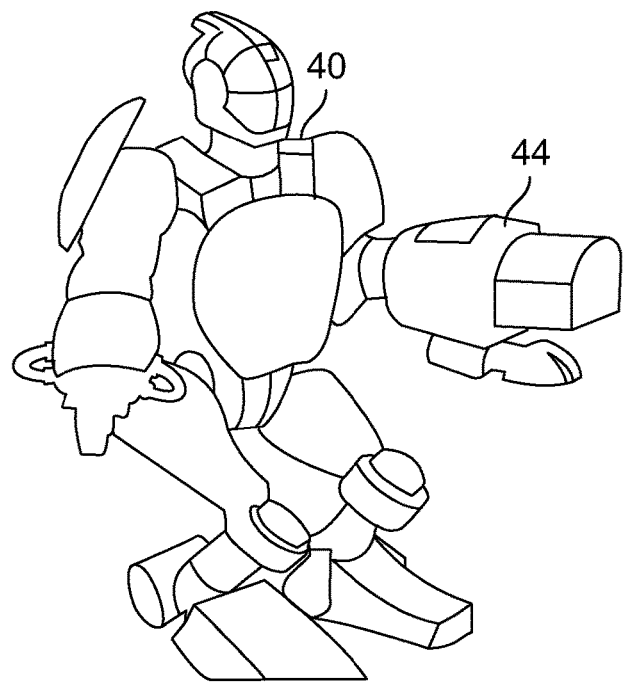
FIG. 4C shows the physical robot operating with the toy robotic arm attached.

FIG. 4B shows the physical toy robotic arm attaching as an interchangeable part of the robot. In this figure, the blaster arm attachment 44 is attached to the robot physical game piece 40. The blaster arm attachment 44 in this embodiment snaps into the socket 62 of the robot physical game piece 40 where a shoulder would go. A ball and socket configuration may be used, although other arrangements are possible. The described embodiment allows for movement to simulate a person's arm. When the blaster arm attachment 44 is snapped into the socket 62, the chest plate 64 may illuminate, and the new combination game piece may make noise and send signals to the videogame application in the electronic device, which may include the noise and illuminations. FIG. 4C shows the physical robot operating with the toy robotic arm attached. The robot physical game piece 40 is shown standing with the blaster arm attachment 44 rotated upward from its initial position in FIG. 4B.

From the combined actions in FIG. 4B and FIG. 4C, the robot shown changed configurations and transmitted a new unique identifier. The robot may have illuminated and made noise as well as transmitted inaudible signals. The player will see the illumination and hear the noise and react accordingly. The videogame application may receive the illumination as signals through the camera in the electronic device and the noise as signals through a microphone also in the electronic device. The videogame application will also receive the inaudible transmitted signals. All these signals will cause the videogame application to react accordingly by identifying the new combination of parts, by changing the virtual character accordingly, by making appropriate noises and illumination, and by starting or continuing a videogame. Additionally, when the blaster arm attachment 44 is rotated from its initial position to its position in FIG. 4C, the blaster arm of the virtual character in the videogame application will also rotate correspondingly.

Figure 5A:
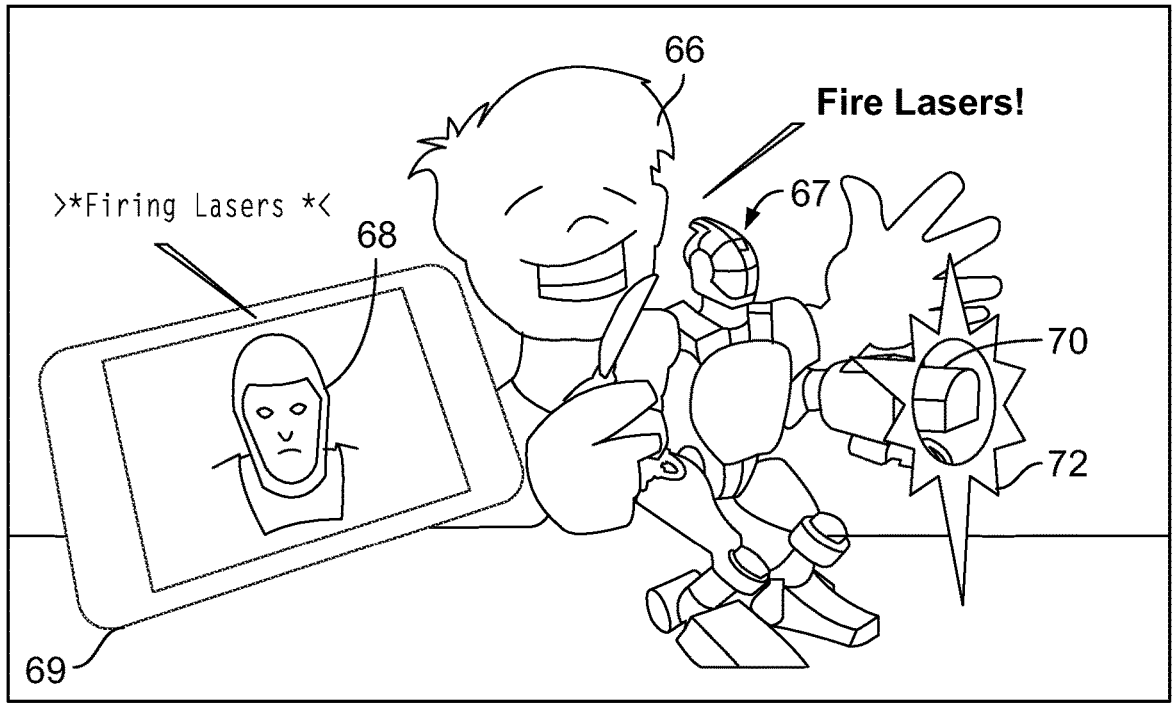
FIG. 5A demonstrates voice recognition used by the physical robot and by the videogame application on the electronic device.

FIG. 5A demonstrates voice recognition used by the physical robot and by the videogame application on the electronic device. In this figure, the player 66 is situated near an assembled robot 67 that has been fitted with the blaster arm attachment 70. The player 66 is also near an electronic device 69 running a videogame application showing a virtual character 68. In this example, the player 66 commands the assembled robot 67 with the blaster arm attachment 70 to "Fire Lasers!". Because of voice recognition in both the assembled robot 67 and in the electronic device 69 and used in the videogame application, the blaster arm attachment 70 of the assembled robot 67 will make illumination and noise 72 and the videogame application virtual character 68 will say "Firing Lasers". Likewise, the virtual character 68 may also order the assembled robot 67 to fire its lasers, and the assembled robot 67 may tell the virtual character to do something. Also, the virtual character 68 and the assembled robot 67 may instruct the player 66 to act or not to act.

Figure 5B:
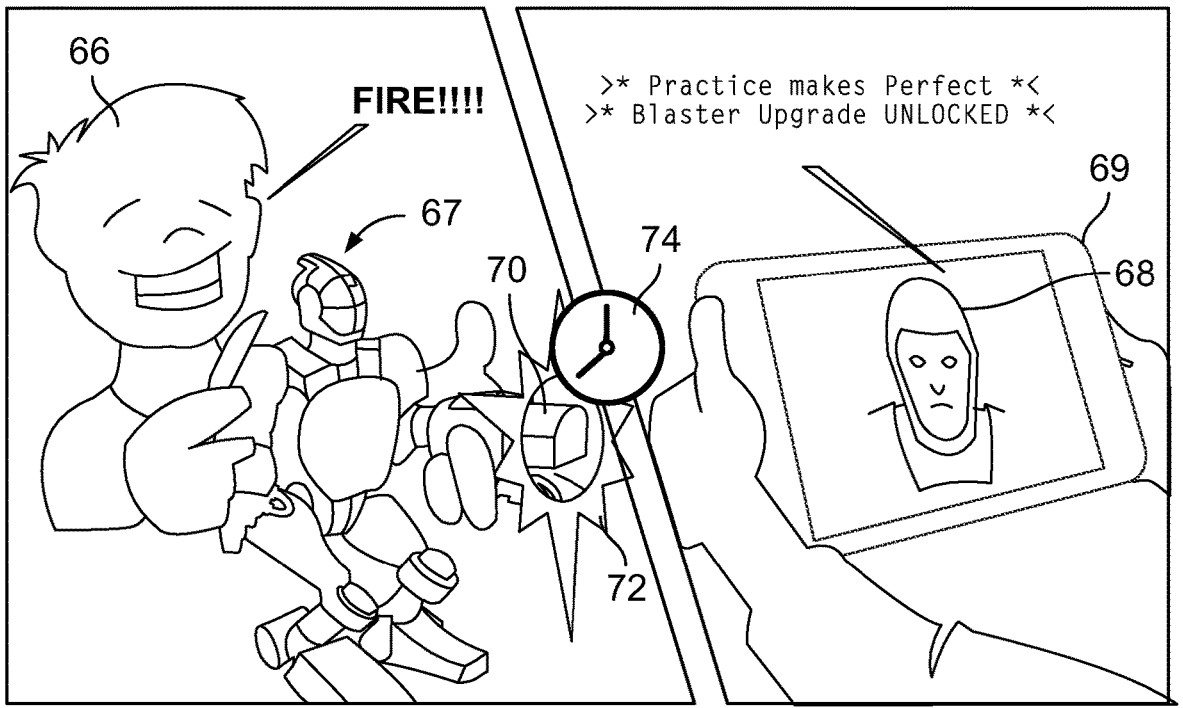
FIG. 5B shows how using the physical toy produces digital rewards.

FIG. 5B shows how using the physical toy produces digital rewards. In this figure, the clock icon 74 is placed between the split frame to show that time has elapsed from the time the player 66 tells the assembled robot 67 to fire the blaster arm attachment 70 several times until the time the virtual character 68 in the videogame application on the electronic device 69 tells the player 66 that the player 66 has unlocked an upgrade. For example, the player 66 may have to tell the assembled robot 67 to fire the blaster arm attachment 70 twenty times for the upgrade. The blaster arm attachment 70 will emit illumination and noise 72 twenty times, and the videogame application will sense and count each signal from the illumination and noise 72 and then respond by stating audibly "Practice makes perfect. Blaster upgrade unlocked." Thus, the player 66 has been digitally rewarded in the virtual environment for physical play with the assembled robot 67.

Figure 5C:
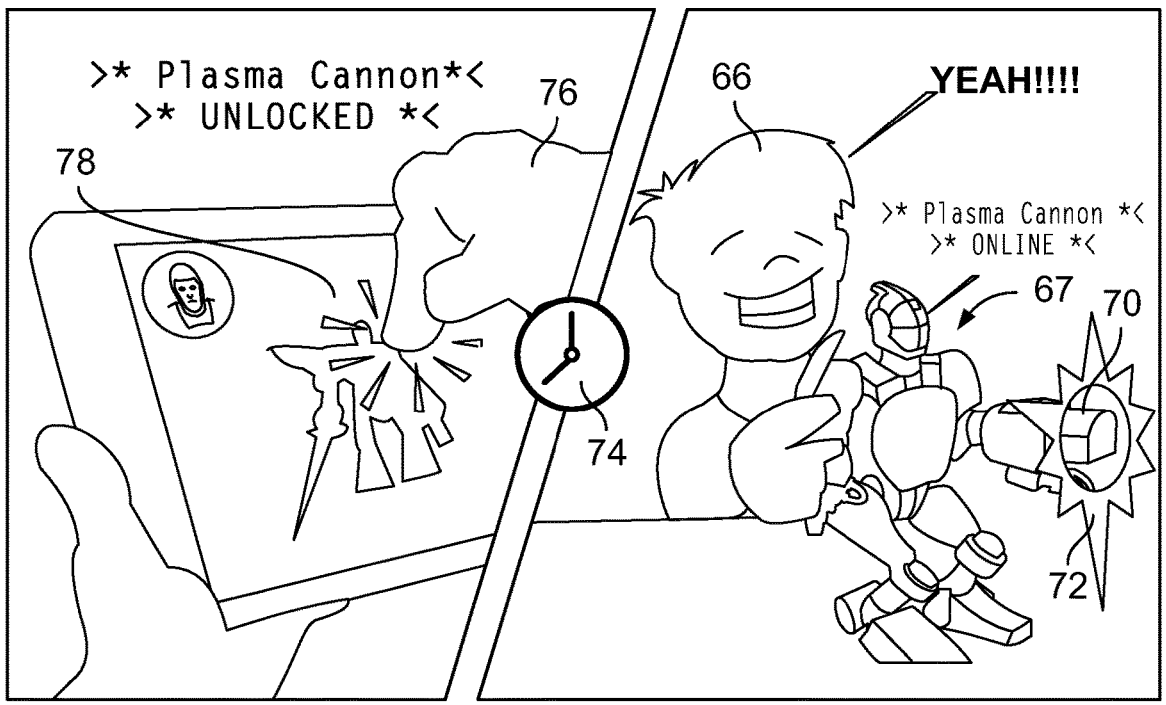
FIG. 5C shows how using the videogame application produces rewards for the physical toy.

FIG. 5C shows how using the videogame application produces rewards for the physical toy. In this figure, the player's hand 76 is shown controlling the videogame application 78, and because the player 66 has earned a reward in the videogame application 78, the videogame application 78 unlocked a plasma cannon and notified the player 66 by stating "Plasma Cannon Unlocked" either on the video display or audibly or both. As a reward for the digital play in the virtual environment by playing the videogame application for an elapsed time shown by the clock icon 74, the behavior of the assembled robot 67 changes. In this figure, the blaster arm attachment 70 will provide changed illumination and noise 72 perhaps louder, perhaps noisier, perhaps brighter, etc.

Figure 6A:
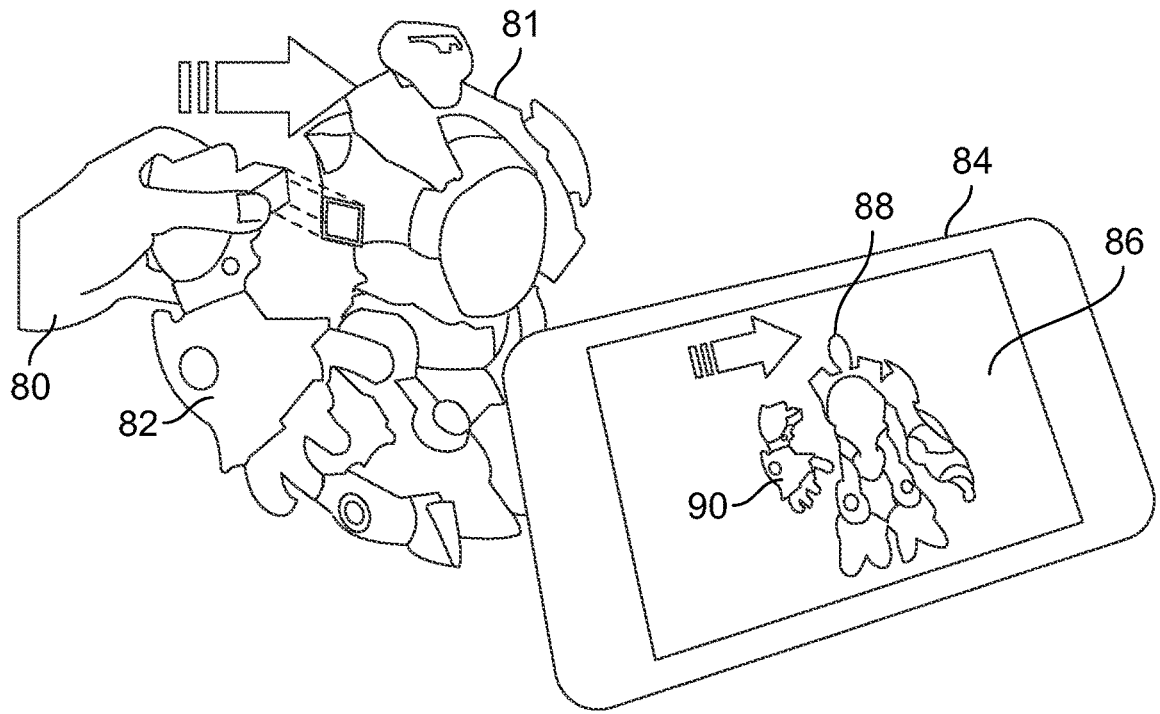
FIG. 6A shows how attaching an arm to the physical robot correspondingly attaches an arm to the virtual robot.

FIG. 6A shows how attaching an arm to the physical robot correspondingly attaches an arm to the virtual robot. Here, the player's hand 80 is shown attaching a real arm attachment 82 to the physical robot 81. The arrow above the player's hand 80 and the dotted lines show how the player will attach the real arm attachment 82. In the described embodiment, the videogame application 86 runs on the electronic device 84 and features a virtual character 88 receiving a virtual arm attachment 90. As shown, both the physical robot 81 and the virtual character 88 start with no right arm, and when the player attaches the real arm attachment 82, the videogame application 86 responds and simultaneously adds the virtual arm attachment 90 to the virtual character 88. The arrow shown on the videogame application 86 display demonstrates the direction that the virtual arm attachment moves to attach to the virtual character 88.

Figure 6B:
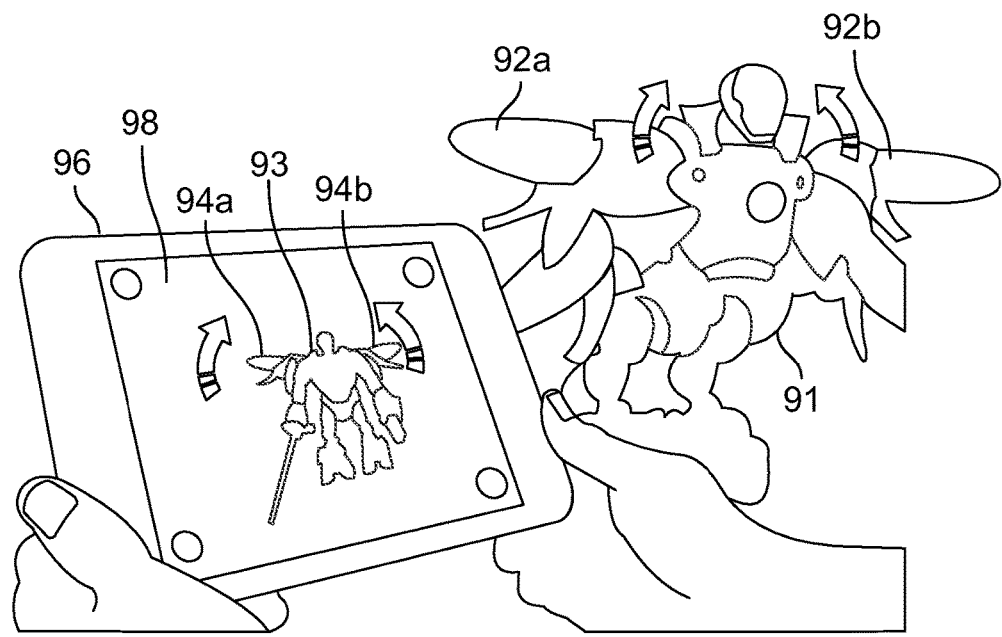
FIG. 6B shows how moving the wings of the virtual robot correspondingly moves the wings of the physical robot.

FIG. 6B shows how moving the wings of the virtual robot correspondingly moves the wings of the physical robot. Here, the physical robot 91 has been outfitted with real wings 92a-b that move up and down as shown in the corresponding arrows. Likewise, in the described embodiments, the virtual character 93 has been equipped with virtual wings 94*a-b* that move up and down as shown in the corresponding arrows. Furthermore, as described, when the player moves the virtual wings 94*a-b* in the videogame application 98 on the electronic device 96 with user input, the real wings 92*a-b* will move correspondingly responsive to signals from the videogame application 98 through the electronic device 96. Similarly, when the player moves the real wings 92*a-b* on the physical robot 91, the virtual wings 94*a-b* will move accordingly in the same manner.

Figure 7A:
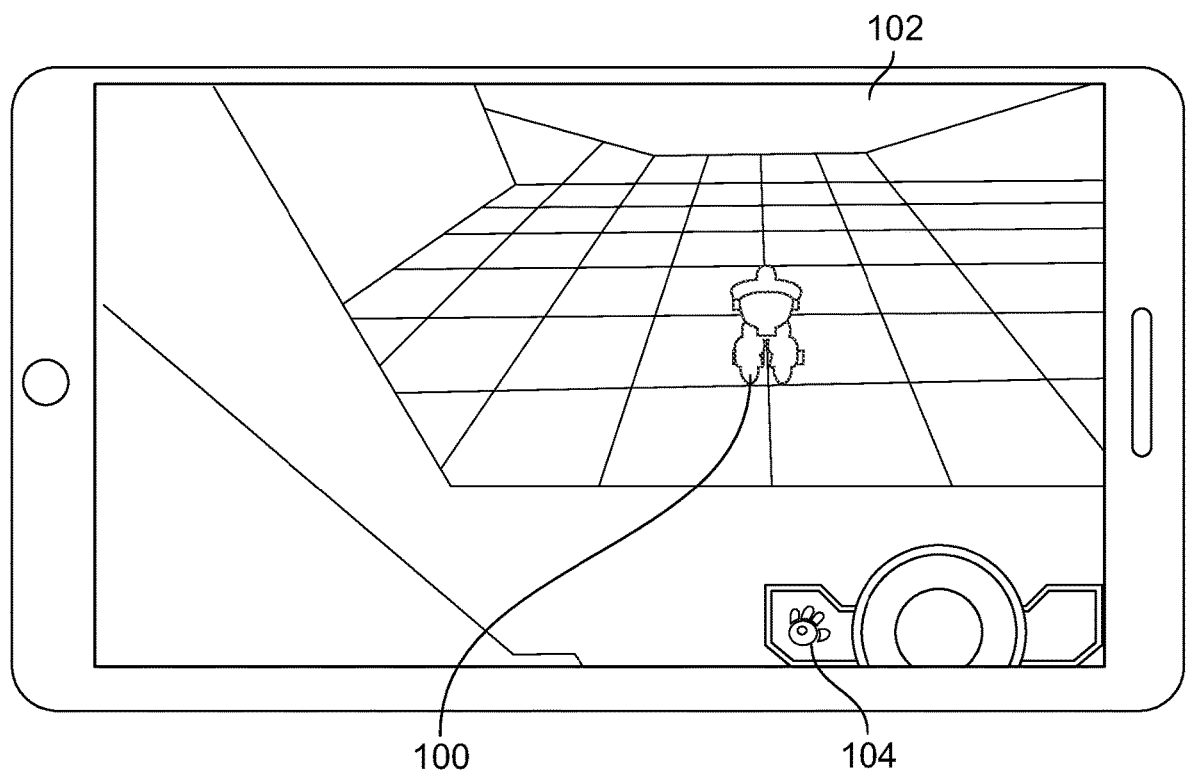
FIG. 7A shows a virtual robot character in the videogame with no arms attached.
Figure 7B:
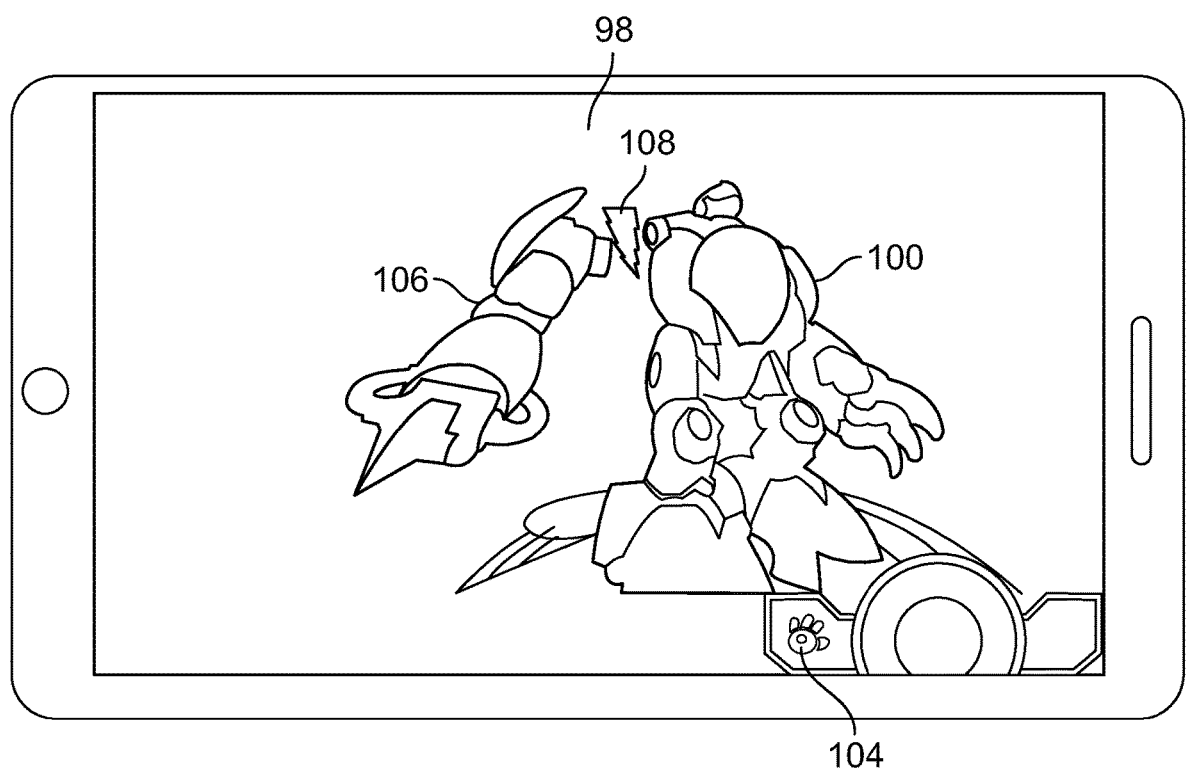
FIG. 7B shows the virtual robot character in the videogame application with its virtual blaster-equipped arm attaching in response to the player attaching a physical blaster-equipped arm to the physical robot.

FIG. 7A through FIG. 7H show how the virtual character in an ongoing videogame may change body parts during the game without game interruption. FIG. 7A shows a virtual robot character in the videogame with no arms attached. The virtual robot character 100 stands in the virtual environment 102 with no arms attached. The attachment indicator 104 shows that the virtual robot character 100 has no attachments on its shoulders. Then, the player attaches a physical arm to the physical robot corresponding to the videogame application. FIG. 7B shows the virtual robot character 100 in the videogame application 98 with its virtual blaster-equipped arm 106 attaching in response to the player attaching a physical blaster-equipped arm to the physical robot. The video game application 98 plays an attachment animation 108 where the virtual blaster-equipped arm 106 attaches. The attachment indicator 104 starts changing as the virtual blaster-equipped arm 106 attaches.

Figure 7C:
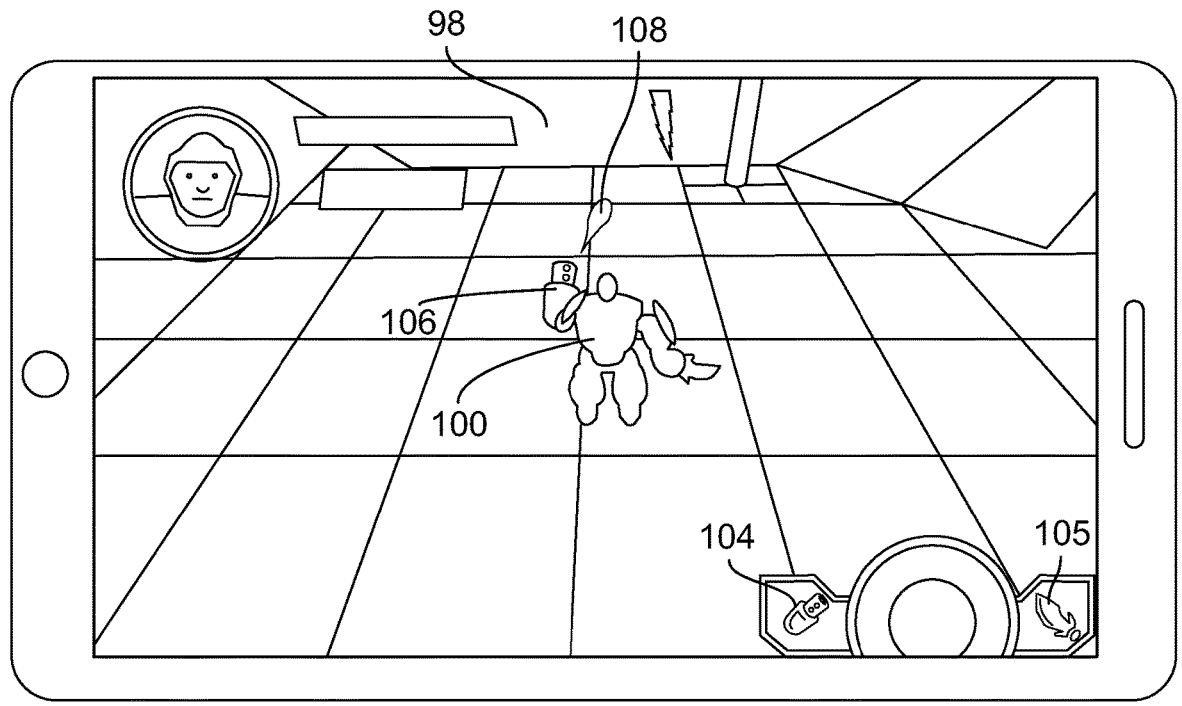
FIG. 7C shows the virtual robot character in the videogame application shooting the blaster of the virtual blaster-equipped arm with the attachment animation.
Figure 7D:
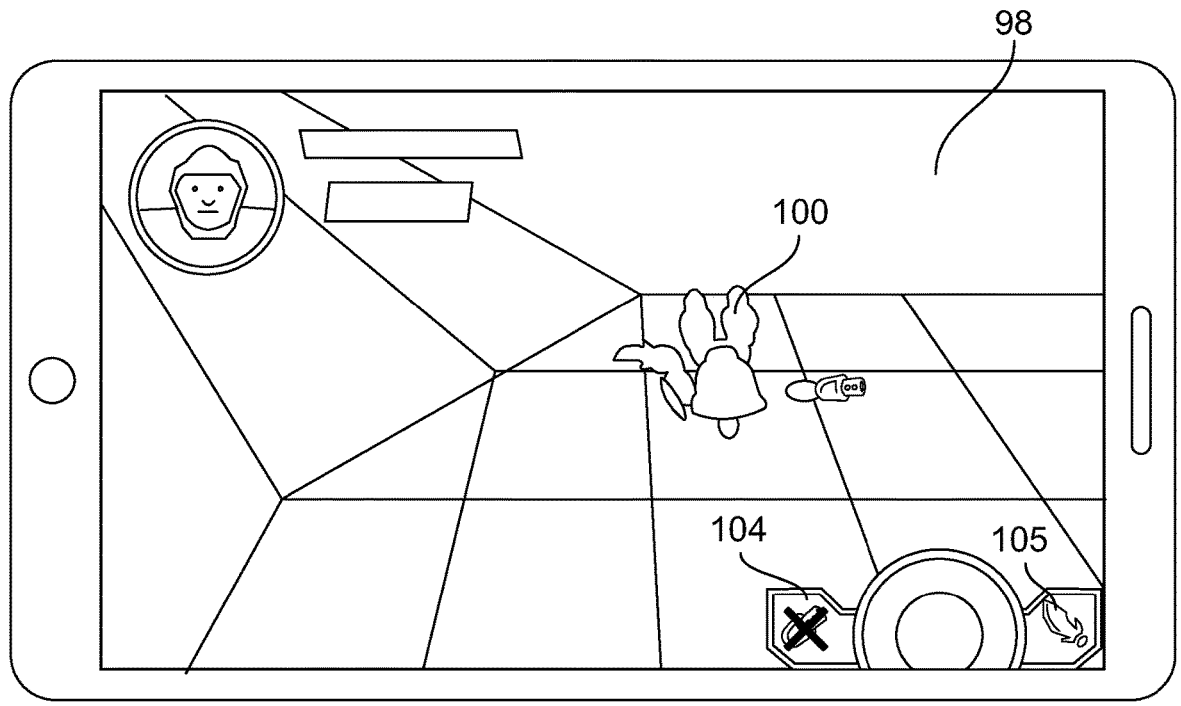
FIG. 7D shows the virtual robot character in the videogame application with a damaged arm.

FIG. 7C shows the virtual robot character 100 in the videogame application 98 shooting the blaster of the virtual blaster-equipped arm 106 with the attachment animation 108. The attachment indicator 104 now shows that the virtual blaster-equipped arm 106 is attached and the firepower indicator 105 shows that the player has remaining firepower. When the player causes the virtual blaster-equipped arm 106 to fire, the physical robot may also fire its blaster. FIG. 7D shows the virtual robot character 100 in the videogame application 98 with a damaged arm. The attachment indicator 104 now indicates that the arm is not functioning or is missing. The firepower indicator 105 shows that the player still has firepower and may reattach the virtual blaster-equipped arm 106 again either virtually or physically.

Figure 7E:
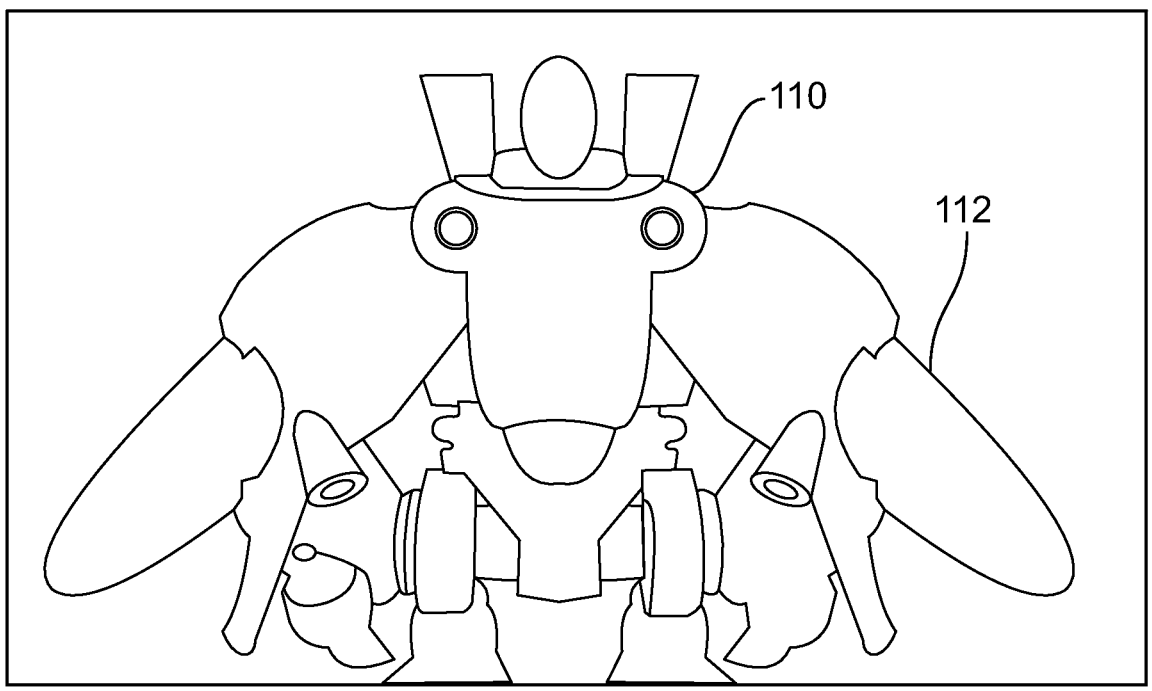
FIG. 7E shows the physical robot character with wings attached.
Figure 7F:
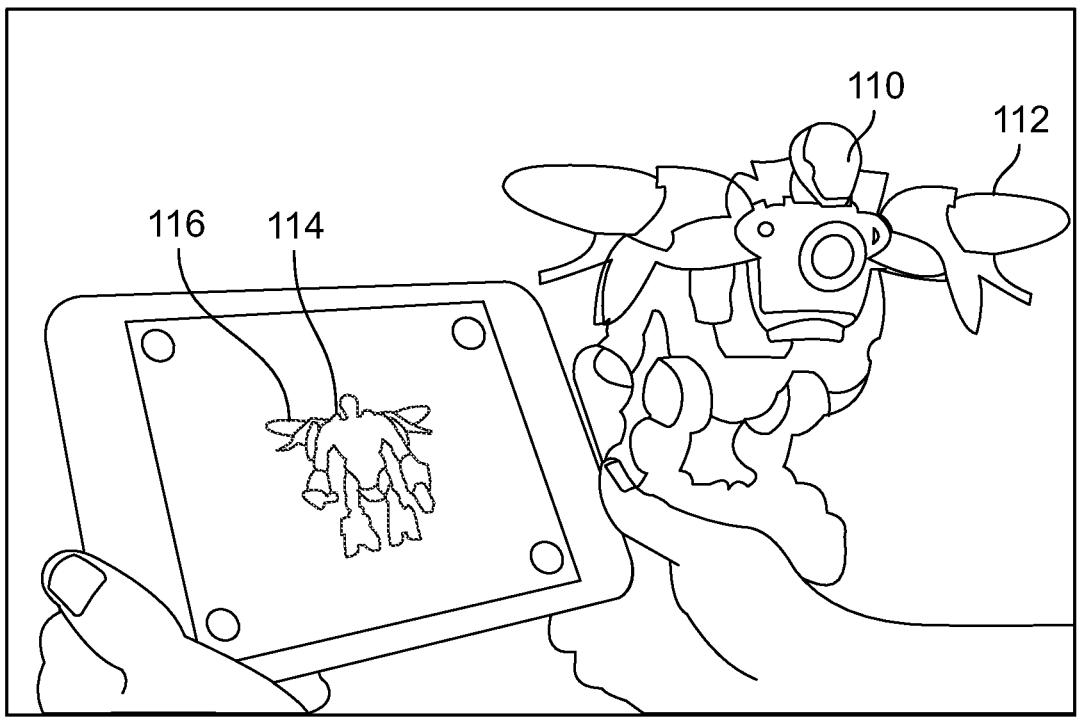
FIG. 7F shows the physical robot character with wings attached in an upright position and the virtual robot character also with virtual wings attached in an upright position.
Figure 7G:
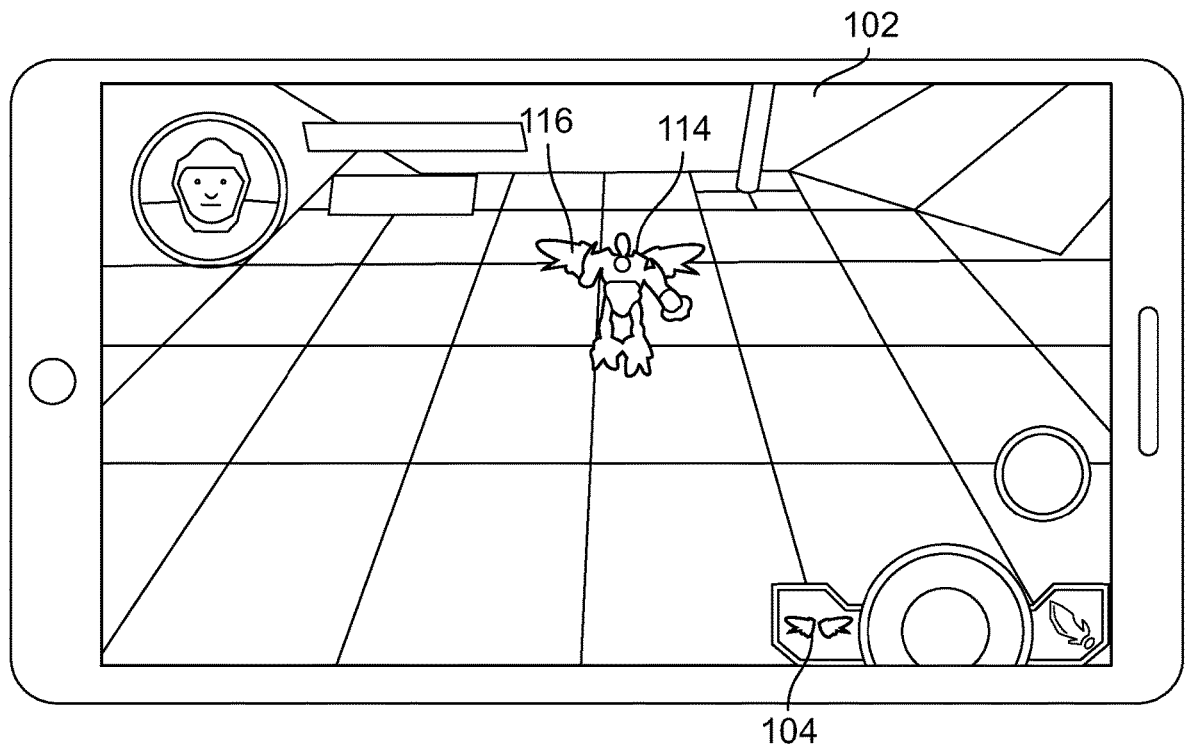
FIG. 7G shows the virtual robot character ready to fight again within the videogame with virtual wings in the virtual environment.

In this example of the described embodiment, the player has chosen to add wings to the physical robot. FIG. 7E shows the physical robot character 110 with wings 112 attached. The new combination will signal the videogame application that the wings are attached, and the videogame will respond accordingly. FIG. 7F shows the physical robot 110 character with wings 112 attached in an upright position and the virtual robot character 114 also with virtual wings 116 attached in an upright position. FIG. 7G shows the virtual robot character 114 ready to fight again within the videogame with virtual wings 116 in the virtual environment 102. The attachment indicator 104 shows that the virtual wings 104 and the physical wings have been attached.

Figure 8A:
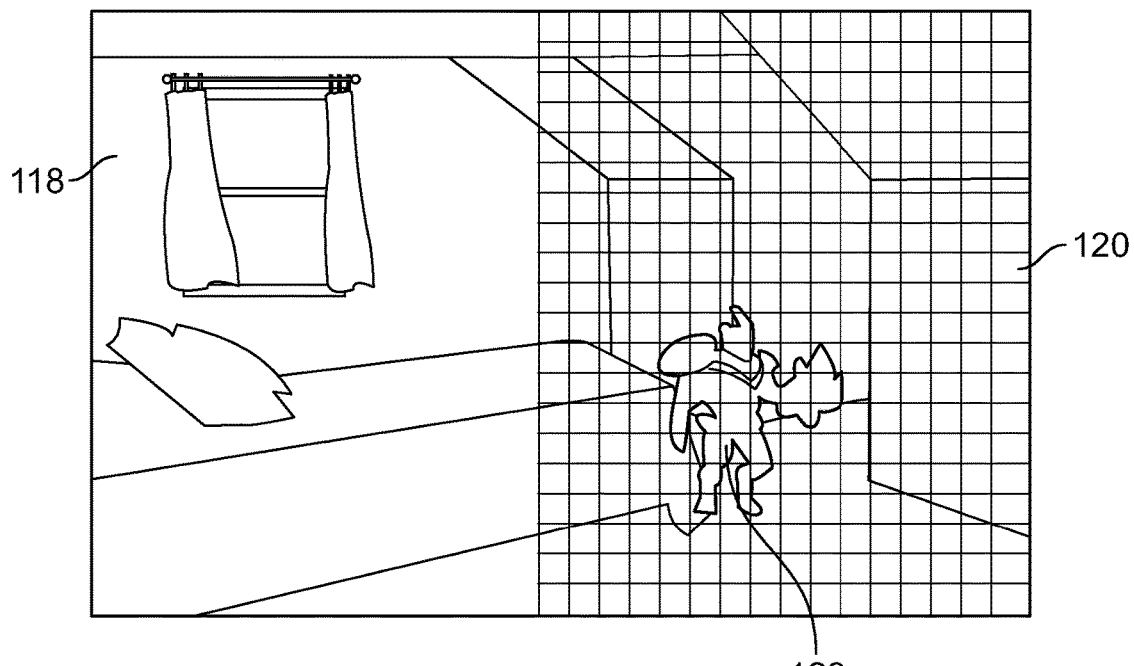
FIG. 8A shows how a camera may be used to create a combined real and virtual environment for game play.

FIG. 8A shows how a camera may be used to create a combined real and virtual environment for game play. The view shown in FIG. 8A is a game playing field as it appears on the display of an electronic device. This game playing field is a combination of the real environment 118, the image of which was captured by the camera on the electronic device, and the virtual environment 120 superimposed over the camera image of the real environment 118, which may be in real time. The virtual character 122 appears in the mixed portion of the display that contains both the real environment 118 and the virtual environment 120 superimposed. This combined environment may be used as the videogame application environment in which a player plays both videogames and physical real world games within the view of the camera. Thus, the player may see the inside of the player's home with a superimposed virtual environment and real and virtual characters to attack or to befriend and resources to use and to collect. Geographical positioning may be added to this embodiment to expand the game playing area outside the viewing area of the camera that may be brought into the viewable area by moving the electronic device. In this case, the player may be able to scan his or her surroundings and play missions over a broad area.

Figure 8B:
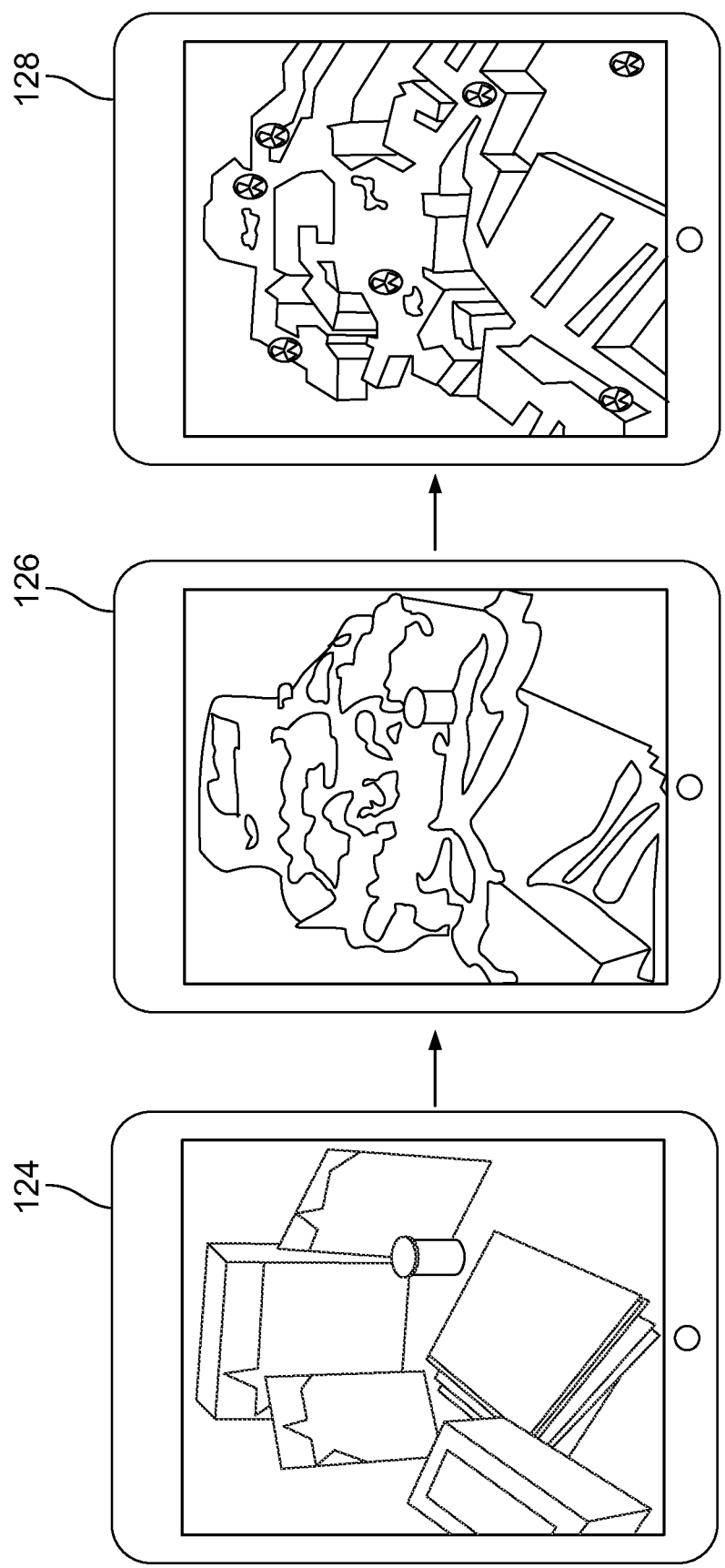
FIG. 8B shows the transformation of a real environment image to a virtual environment mapping of the real environment.

FIG. 8B shows the transformation of a real environment image to a virtual environment mapping of the real environment. In this example, the transformation starts with a photo image 124 of the real environment as the player sees it through the camera on the electronic device. The photo image 124 goes through a filtering process 126 and creates a virtual landscape 128 upon which a player may play and enter portals into enjoyable gaming.

Other features of the described embodiments of the gaming ecosystem include access to a network through the electronic device where players may make in application purchases that enhance both the physical environment with toys and related merchandise and the virtual environment with exclusive content, upgrades, weapons, vehicles, evolved characters, etc.

As an added incentive to keep a player playing both in the physical real environment and in the virtual environment, described embodiments may use multipliers to accelerate the rates at which a player earns points and increases levels. For example, a player's earned points may grow at rates increased by increasing multiples as the amount of time that the player plays in the virtual environment increases. Likewise, a player's earning power may increase by multiples as the player increases levels to provide a reward for earned experience. Multipliers may also be used to increase points or levels based on how much a player spends on in-app purchases, how much time a player spends playing in the physical environment, a promotional offer, etc.

While the present inventions have been illustrated by a description of various embodiments and while these embodiments have been set forth in considerable detail, it is intended that the scope of the inventions be defined by the appended claims. It will be appreciated by those skilled in the art that modifications to the foregoing preferred embodiments may be made in various aspects. It is deemed that the spirit and scope of the inventions encompass such variations to be preferred embodiments as would be apparent to one of ordinary skill in the art and familiar with the teachings of the present application.

What is claimed is:

1. A gaming system for integrated computer-related and physical game play interactions comprising:
   a physical game piece comprising:
   a unique alphanumeric identifier;
   a first signal transmitter configured to transmit the unique alphanumeric identifier;
   a first signal receiver configured to receive signals to control sensory detectable outputs; and
   a multi-state signal generator responsive to signals received by the first signal receiver and configured to output a plurality of sensory detectable signals with each sensory detectable signal corresponding to a particular state of the multi-state signal generator;

a plurality of mutually attachable physical game pieces and accessories with the multi-state signal generator responsive thereto;

the first signal transmitter further configured to transmit with the unique alphanumeric identifier one of a plurality of electronic-device-readable signals with each electronic-device-readable signal corresponding to a particular state of the multi-state signal generator; and an electronic device comprising:

a second signal receiver configured to receive the signals transmitted from the first signal transmitter;

a second signal transmitter in communication with the first signal receiver and configured to transmit signals to control the sensory detectable signals output;

a user input interface configured to receive user input; and a game application in communication with the second signal receiver, the second signal transmitter, and the user input interface and responsive to signals received by the second signal receiver and to user input from the user input interface comprising:

a table of known unique alphanumeric identifiers;

a game piece electronic-device-readable signal interpreter in communication with the second signal receiver and configured to receive the unique alphanumeric identifier and game piece electronic-device-readable signal, to query the table to match the unique alphanumeric identifier to a table element, to interpret the game piece electronic-device-readable signal, and to transmit signals to control the sensory detectable outputs to the first receiver through the second signal transmitter in response to the game piece electronic-device-readable signal when the unique alphanumeric identifier matches a table element;

a single digital character uniquely associated with the unique alphanumeric identifier, said digital character altered with specific connections of game pieces and accessories connected for a specific configuration according to said plural mutually attachable physical game pieces; and a plurality of sequentially accessible gaming program modules wherein a user may accumulate a game score with respectively sequential levels of increasing difficulty featuring the digital character in a digital game environment with the digital character and the digital game environment responsive to user input through the user input interface and to the game piece electronic-device-readable signals where the user accesses the sequentially accessible gaming program modules and increases the difficulty level and the accumulated game score based on the quantity of output from the game piece electronic-device-readable signal interpreter and the quantity and pattern of user input.

2. The gaming system recited in claim 1 wherein the game application further comprises a multiplier program module that multiplies one or more of the difficulty level and the accumulated game score by a predetermined multiple based on the quantity of output from the game piece electronic-device-readable signal interpreter and the quantity and pattern of user input.

3. The gaming system recited in claim 1 wherein each combination of one or more game pieces comprises a unique alphanumeric identifier transmittable by the first signal transmitter to output a plurality of sensory detectable signals corresponding to the state of the multi-state signal generator.

4. The gaming system recited in claim 3 wherein the game application further comprises a multiplier program module that multiplies one or more of the difficulty level and the accumulated game score by a predetermined multiple based on the quantity of output from the game piece electronic-device-readable signal interpreter and the quantity and pattern of user input.

5. The gaming system recited in claim 3 further comprising each combination of one or more game pieces configured to output one or both of the sensory detectable signals and the electronic-device-readable signals in response to mechanical manipulation of the combination of one or more game pieces.

6. The gaming system recited in claim 5 wherein the plurality of mutually attachable physical game pieces further comprise a combination of two or more of a weapon, a vehicle, a robot, and a character and wherein exclusive game content becomes accessible in the game application for each combination.

7. The gaming system recited in claim 6 wherein the game application further comprises a database of mutually linkable storyline elements wherein each unique alphanumeric identifier corresponds to a combination of one or more storyline elements and wherein the game application progresses through the combination of one or more storyline elements corresponding to the unique alphanumeric identifier.

8. The gaming system recited in claim 7 wherein the game application is further configured to respond to a change in the unique alphanumeric identifier and corresponding combination of one or more storyline elements in response to a change in the configuration of the plurality of mutually attachable physical game pieces.

9. The gaming system recited in claim 6 wherein the game application is further configured to limit the number of unique alphanumeric identifiers to which the game application responds based on the current storyline element.

10. The gaming system recited in claim 3 further comprising the game application configured to connect to a network and access a network site to let users make in-application purchases.

11. The gaming system recited in claim 1 further comprising one or both of the physical game piece responsive to voice commands received in the first receiver and the game application responsive to voice commands received in the second receiver.

12. The gaming system recited in claim 1 wherein the electronic device further comprises:

a camera configured to capture an image of the area viewable by the electronic device;

a display; and the game application in communication with the camera and the display and configured to combine the image of the area viewable by the electronic device with the digital game environment into an integrated game field on the display and to involve the user, the physical game piece, and the digital character in a game using the integrated game field.

13. The gaming system recited in claim 12 further comprising:

a geographic location sensor configured to create a digital map of the area surrounding the electronic device; and the game application in communication with the geographic location sensor and configured to expand the integrated game field beyond the area viewable by the electronic device to include the area defined by the digital map.

14. The gaming system recited in claim 1 further comprising the physical game piece configured to output one or both of the sensory detectable signals and the electronicdevice-readable signals in response to mechanical manipulation of the physical game piece.

15. The gaming system recited in claim 1 wherein the digital character evolves as the difficulty level increases.

16. A gaming system for integrated computer-related and physical game play interactions comprising:
a plurality of mutually attachable physical game pieces comprising:
a unique alphanumeric identifier for each combination of one or more game pieces;
a first signal transmitter configured to transmit the unique alphanumeric identifier;
a first signal receiver configured to receive signals to control sensory detectable outputs; and
a multi-state signal generator responsive to signals received by the first signal receiver and configured to output a plurality of sensory detectable signals with each sensory detectable signal corresponding to a particular state of the multi-state signal generator;
a plurality of mutually attachable physical game pieces and accessories with the multi-state signal generator responsive thereto;
the first signal transmitter further configured to transmit with the unique alphanumeric identifier one of a plurality of electronic-device-readable signals with each electronic-device-readable signal corresponding to a particular state of the multi-state signal generator; and
an electronic device comprising:
a second signal receiver configured to receive the signals transmitted from the first signal transmitter;
a second signal transmitter in communication with the first signal receiver and configured to transmit signals to control the sensory detectable signals output;
a user input interface configured to receive user input; and
a game application in communication with the second signal receiver, the second signal transmitter, and the user input interface and responsive to signals received by the second signal receiver and to user input from the user input interface comprising:
a table of known unique alphanumeric identifiers;
a game piece electronic-device-readable signal interpreter in communication with the second signal receiver and configured to receive the unique alphanumeric identifier and game piece electronic-device-readable signal, to query the table to match the unique alphanumeric identifier to a table element, to interpret the game piece electronic-device-readable signal, and to transmit signals to control the sensory detectable outputs to the first receiver through the second signal transmitter in response to the game piece electronic-device-readable signal when the unique alphanumeric identifier matches a table element;
a single digital character uniquely associated with the unique alphanumeric identifier, said digital character altered with specific connections of game pieces and accessories connected for a specific configuration according to said plural mutually attachable physical game pieces; and
a plurality of sequentially accessible gaming program modules wherein a user may accumulate a game score with respectively sequential levels of increasing difficulty featuring the digital character in a digital game environment with the digital character and the digital game environment responsive to user input through the user input interface and to the game piece electronic-device-readable signals where the user accesses the sequentially accessible gaming program modules and increases the difficulty level and the accumulated game score based on the quantity of output from the game piece electronic-device-readable signal interpreter and the quantity and pattern of user input.

17. The gaming system recited in claim 16 wherein the game application further comprises a multiplier program module that multiplies one or more of the difficulty level and the accumulated game score by a predetermined multiple based on the quantity of output from the game piece electronic-device-readable signal interpreter and the quantity and pattern of user input.

18. The gaming system recited in claim 16 further comprising each combination of one or more game pieces configured to output one or both of the sensory detectable signals and the electronic-device-readable signals in response to mechanical manipulation of the combination of one or more game pieces.

19. The gaming system recited in claim 16 further comprising the game application configured to connect to a network and access a network site to let users make in-application purchases.

20. A gaming method for integrated computer-related and physical game play interactions comprising:
providing a physical game piece comprising:
transmitting a unique alphanumeric identifier using a first signal transmitter;
receiving signals to control sensory detectable outputs using a first signal receiver;
responding to signals received by the first signal receiver using a multi-state signal generator to output a plurality of sensory detectable signals with each sensory detectable signal corresponding to a particular state of the multi-state signal generator and corresponding to a plurality of mutually attachable physical game pieces and accessories with the multi-state signal generator responsive thereto; and
transmitting with the unique alphanumeric identifier one of a plurality of electronic-device-readable signals with each electronic-device-readable signal corresponding to a particular state of the multi-state signal generator using the first signal transmitter; and
providing an electronic device comprising:
receiving the signals transmitted from the first signal transmitter using a second signal receiver;
communicating with the first signal receiver using a second signal transmitter to transmit signals to control the sensory detectable signals output;
receiving user input using a user input interface; and
providing a game application in communication with the second signal receiver, the second signal transmitter, and the user input interface and responsive to signals received by the second signal receiver and to user input from the user input interface comprising:
providing a table of known unique alphanumeric identifiers;
executing a game piece electronic-device-readable signal interpreter in communication with the second signal receiver comprising:
configuring the game piece electronic-device-readable signal interpreter to receive the unique alphanumeric identifier and game piece electronic-device-readable signal;
querying the table to match the unique alphanumeric identifier to a table element;
interpreting the game piece electronic-device-readable signal; and transmitting signals to control the sensory detectable outputs to the first receiver through the second signal transmitter in response to the game piece electronic-device-readable signal when the unique alphanumeric identifier matches a table element;

providing a single digital character uniquely associated with the unique alphanumeric identifier, said digital character altered with specific connections of game pieces and accessories connected for a specific configuration according to said plural mutually attachable physical game pieces; and accessing a plurality of sequentially accessible gaming program modules wherein a user may accumulate a game score with respectively sequential levels of increasing difficulty featuring the digital character in a digital game environment with the digital character and the digital game environment responding to user input through the user input interface and to the game piece electronic-device-readable signals where the user accesses the sequentially accessible gaming program modules and increasing the difficulty level and the accumulated game score based on the quantity of output from the game piece electronic-device-readable signal interpreter and the quantity and pattern of user input.

* * * * *